Aug. 1, 1967  G. J. H. SAUSELE  3,333,668
TYPESETTER SYSTEM AND APPARATUS
Filed June 3, 1964  13 Sheets-Sheet 1
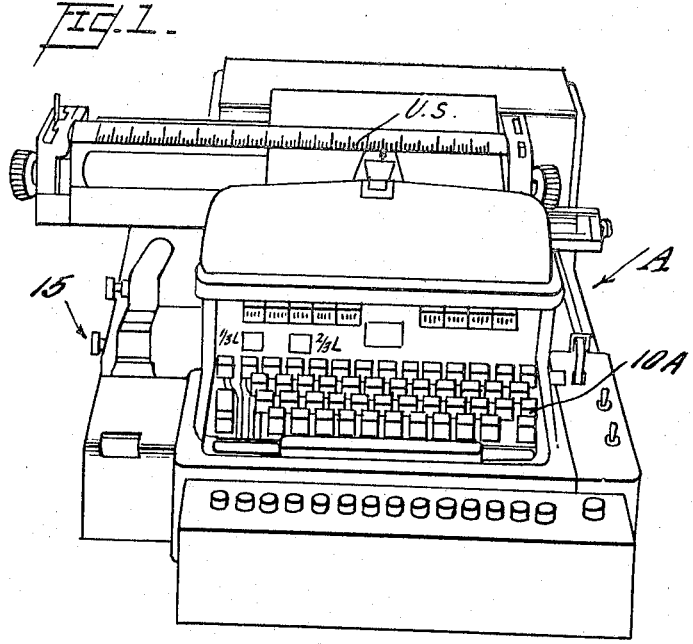
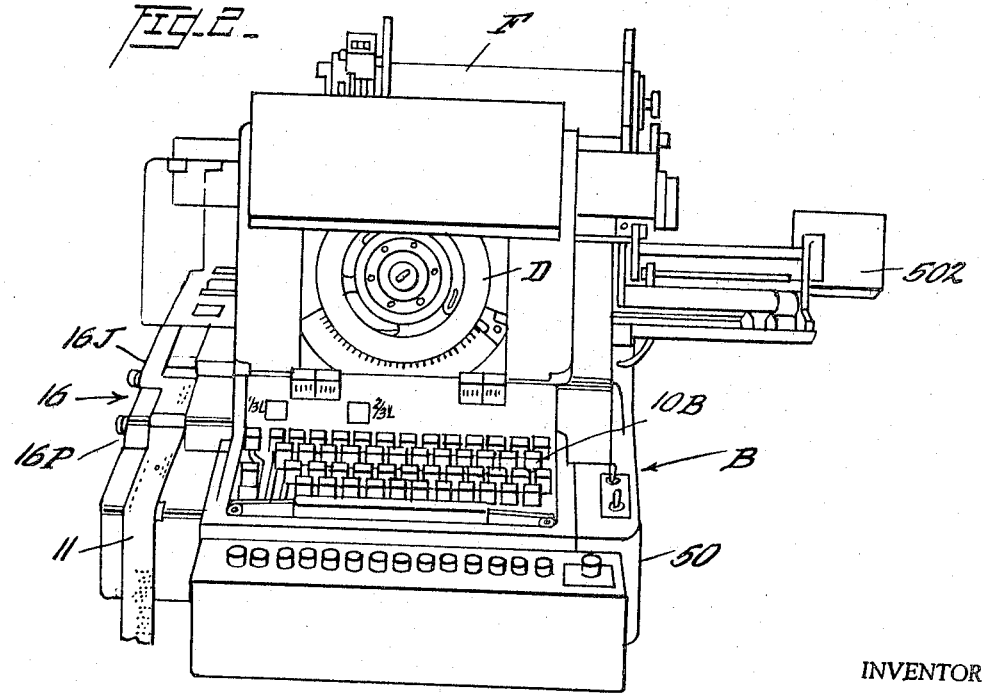
INVENTOR
George J. H. Sausele
BY
Watson, Cole, Grindle & Watson
ATTORNEYS

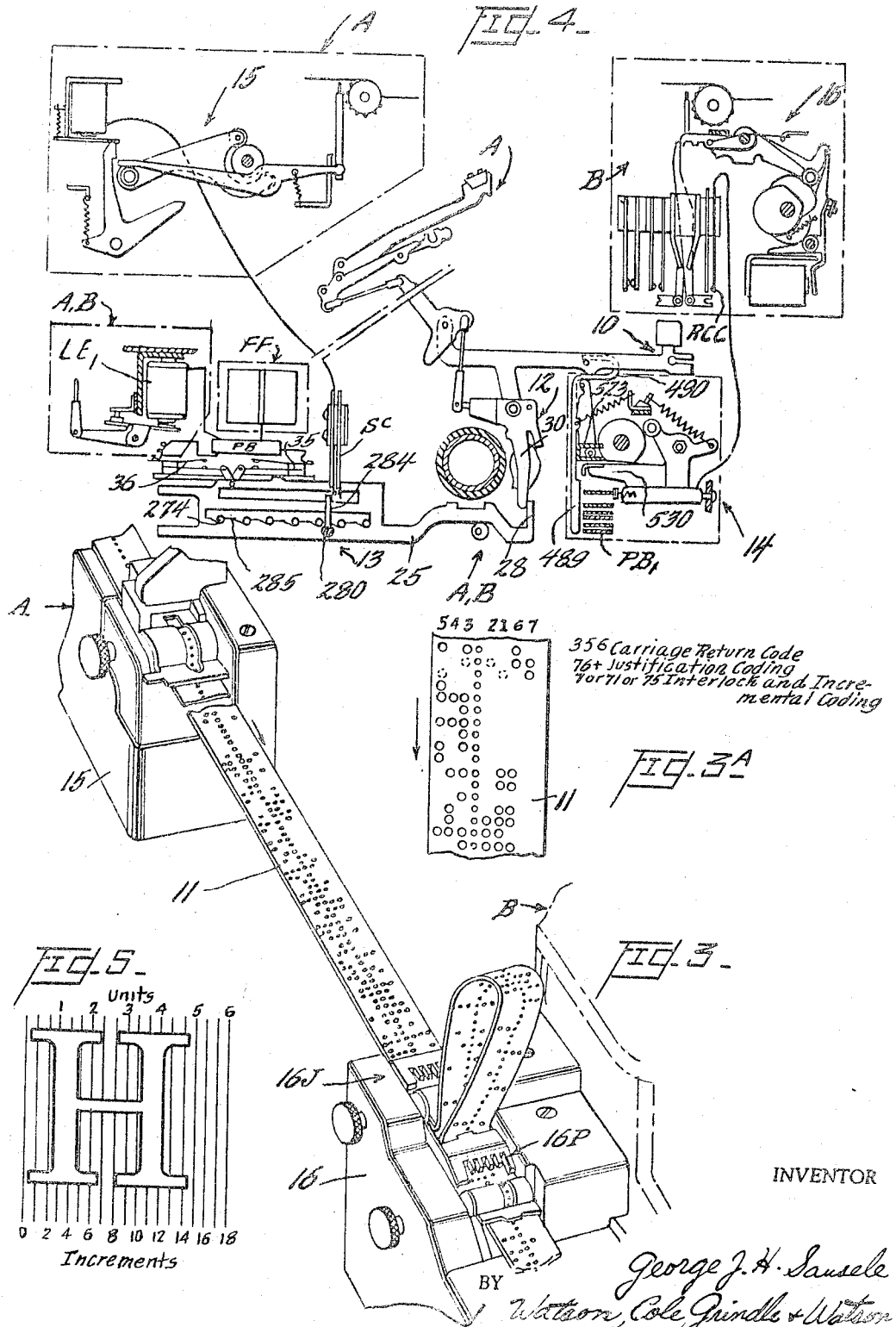

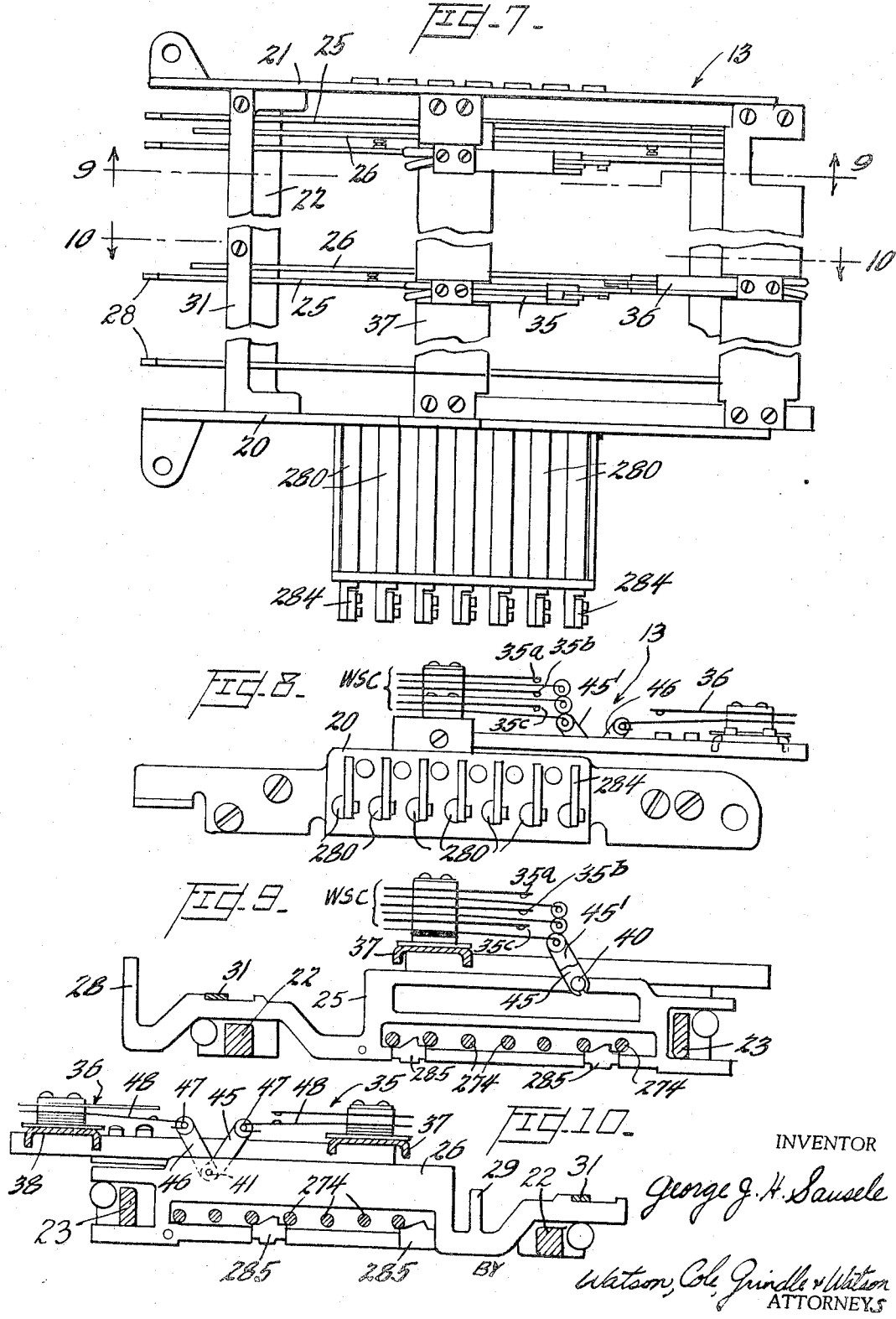

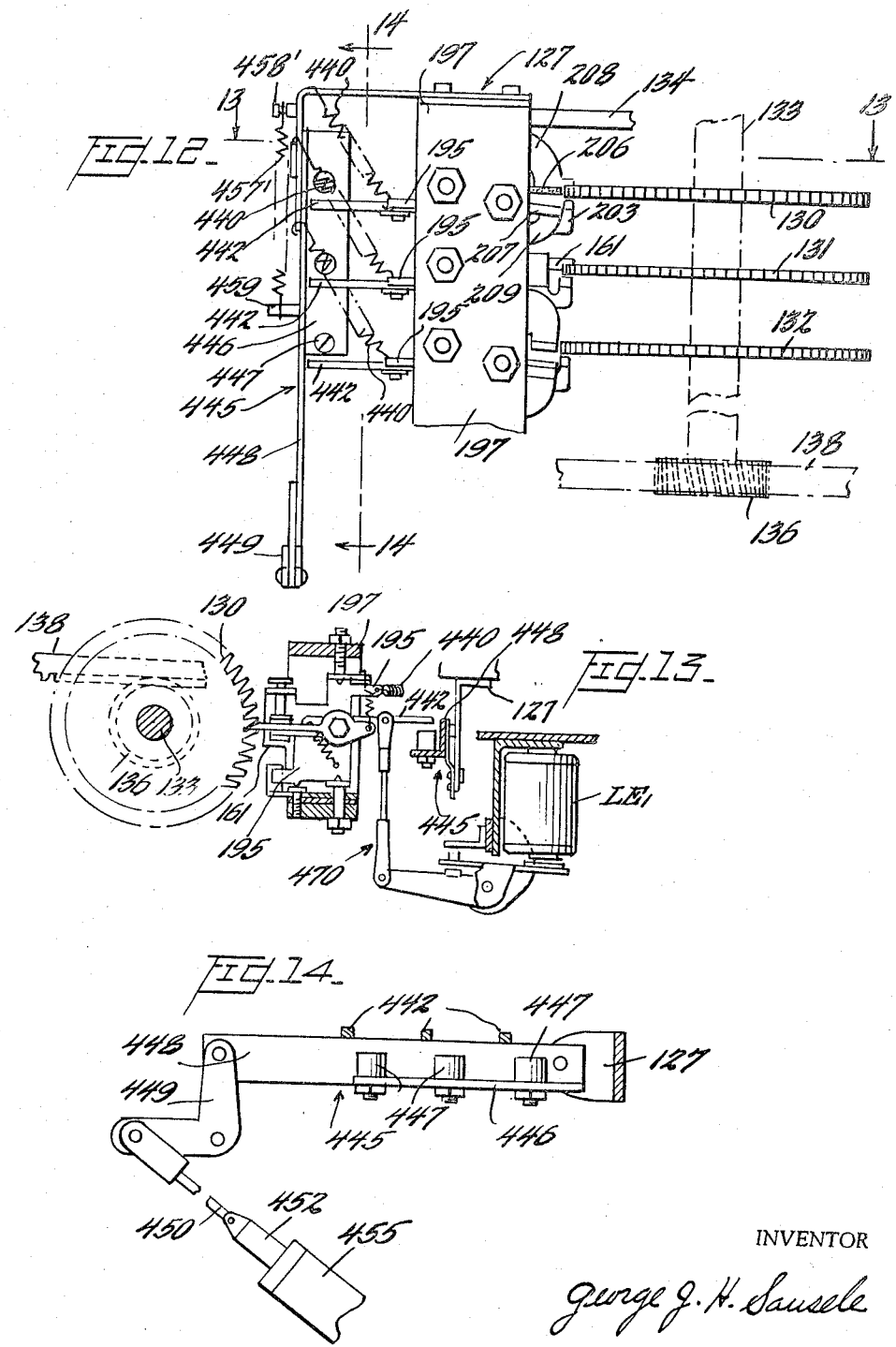

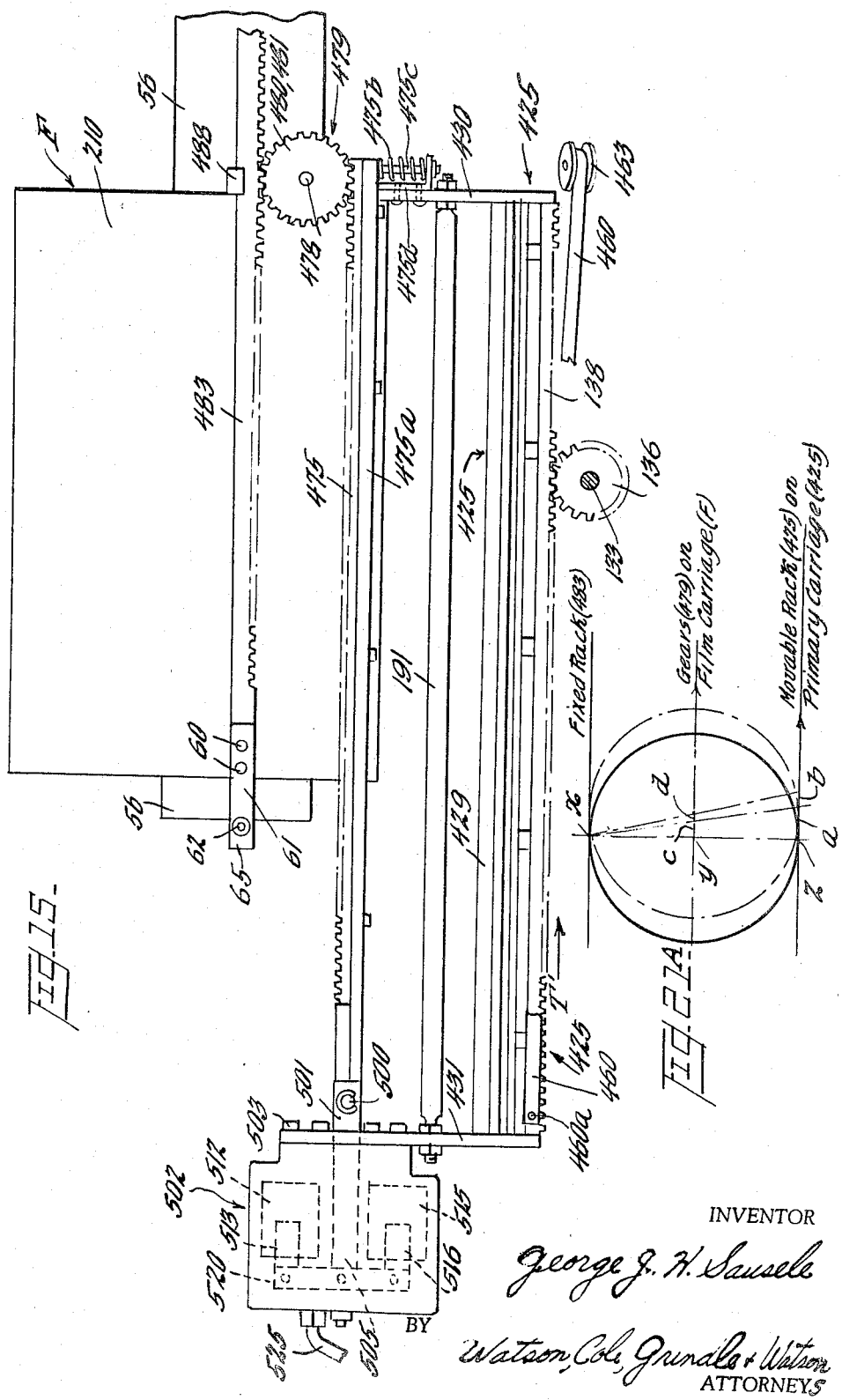

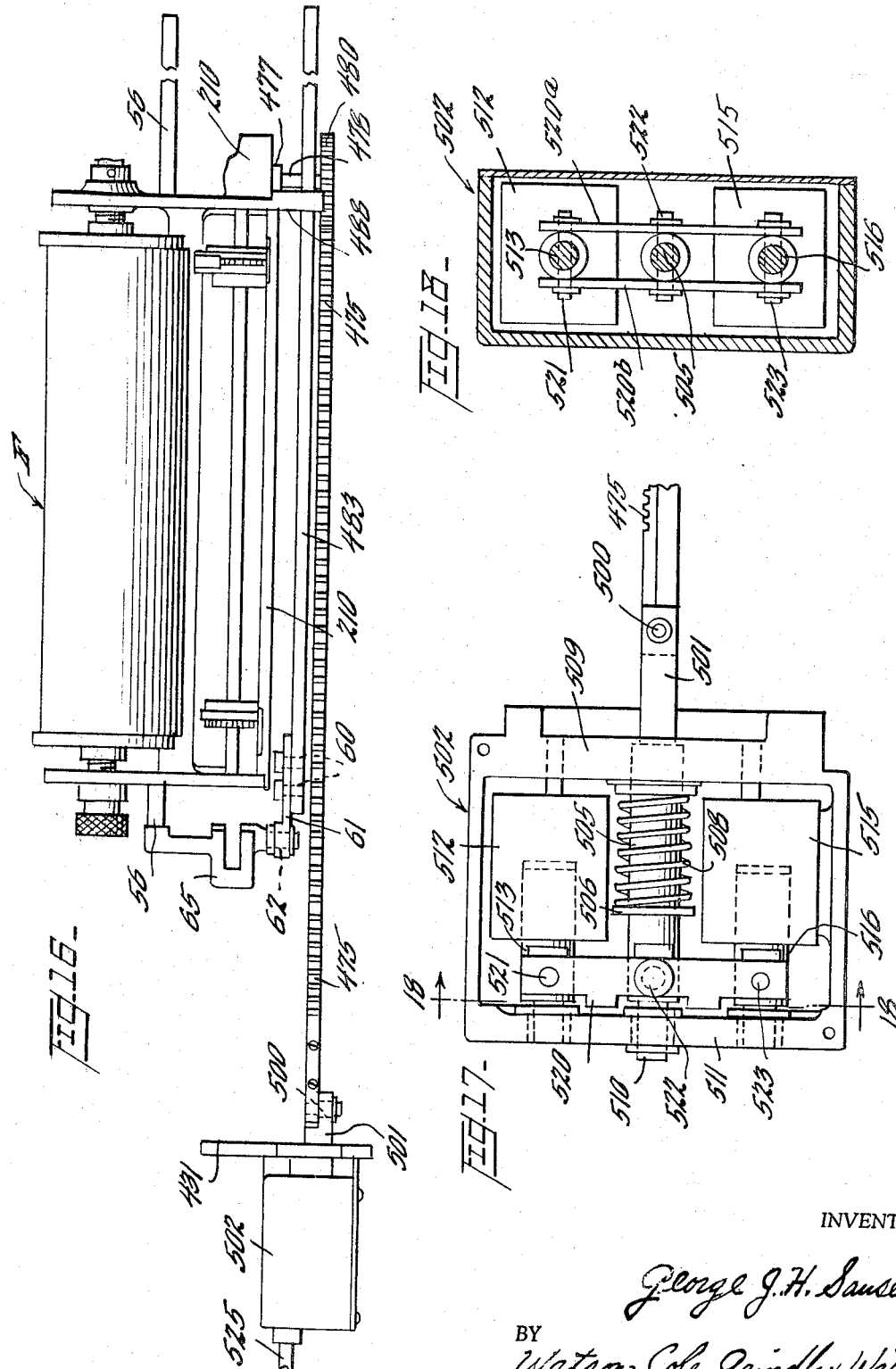

Aug. 1, 1967
G. J. H. SAUSELE
3,333,668
TYPESETTER SYSTEM AND APPARATUS
Filed June 3, 1964
13 Sheets-Sheet 9
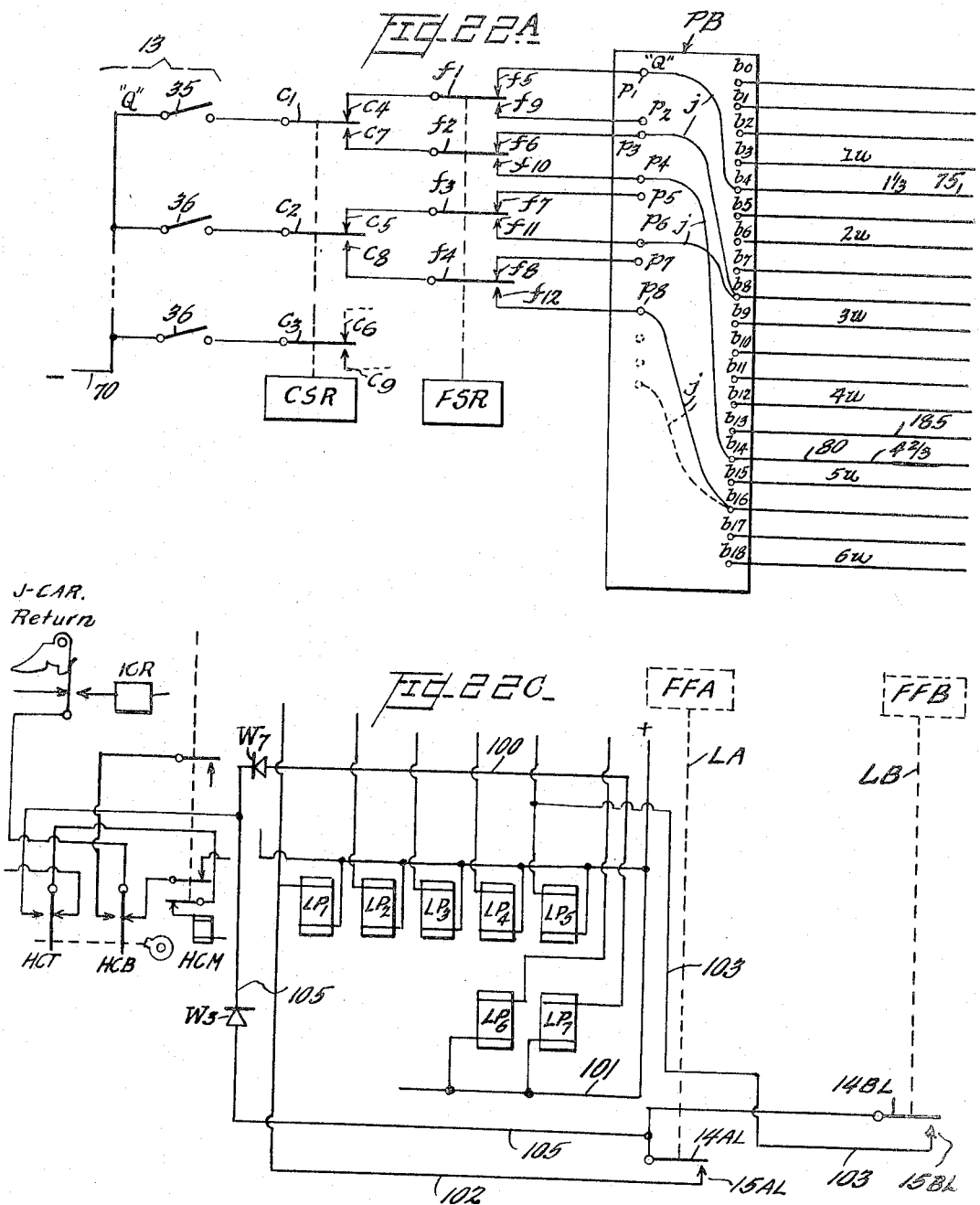
INVENTOR
George J. H. Sausele
BY Watson, Cole, Grindle & Watson
ATTORNEYS

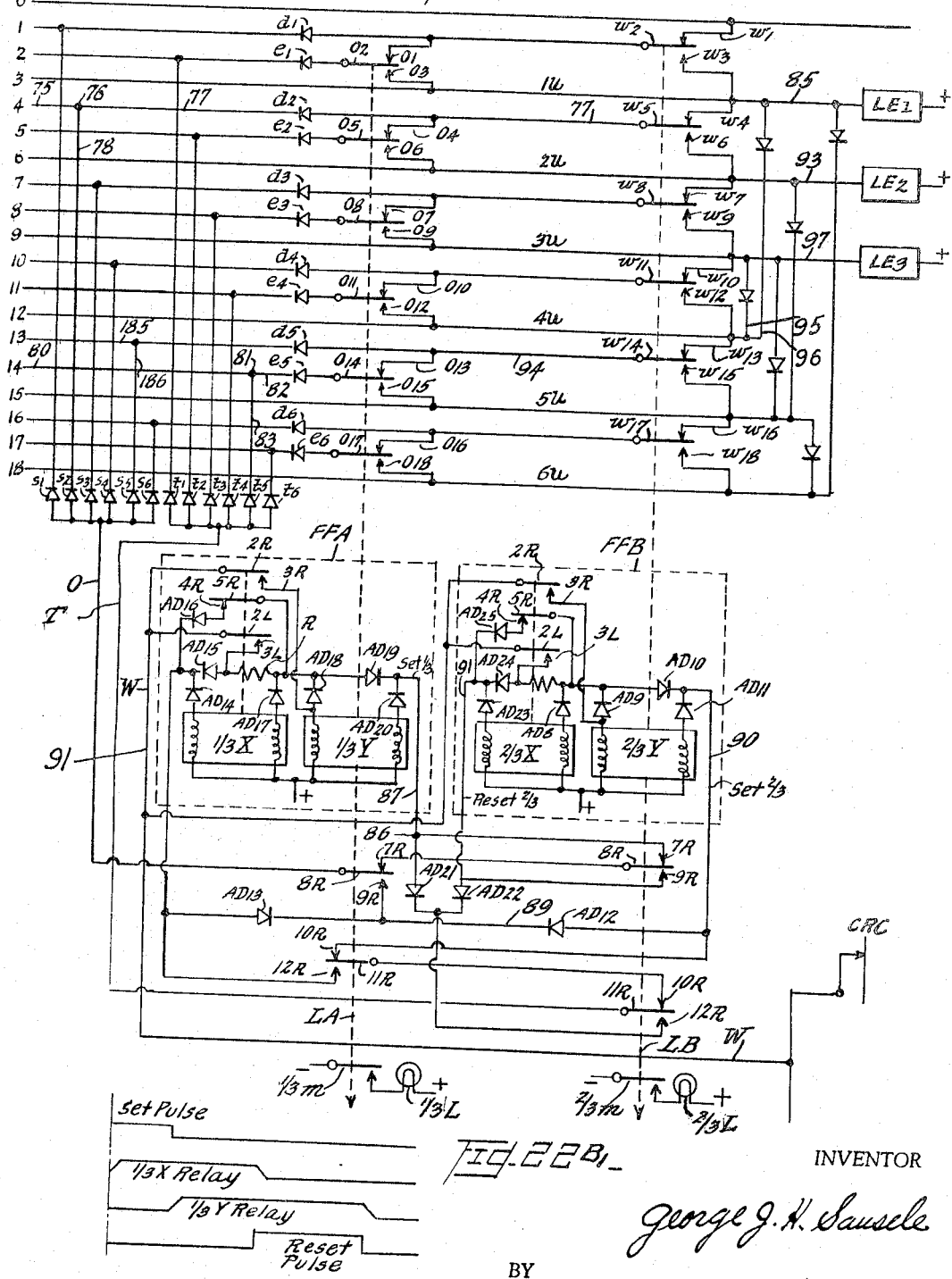

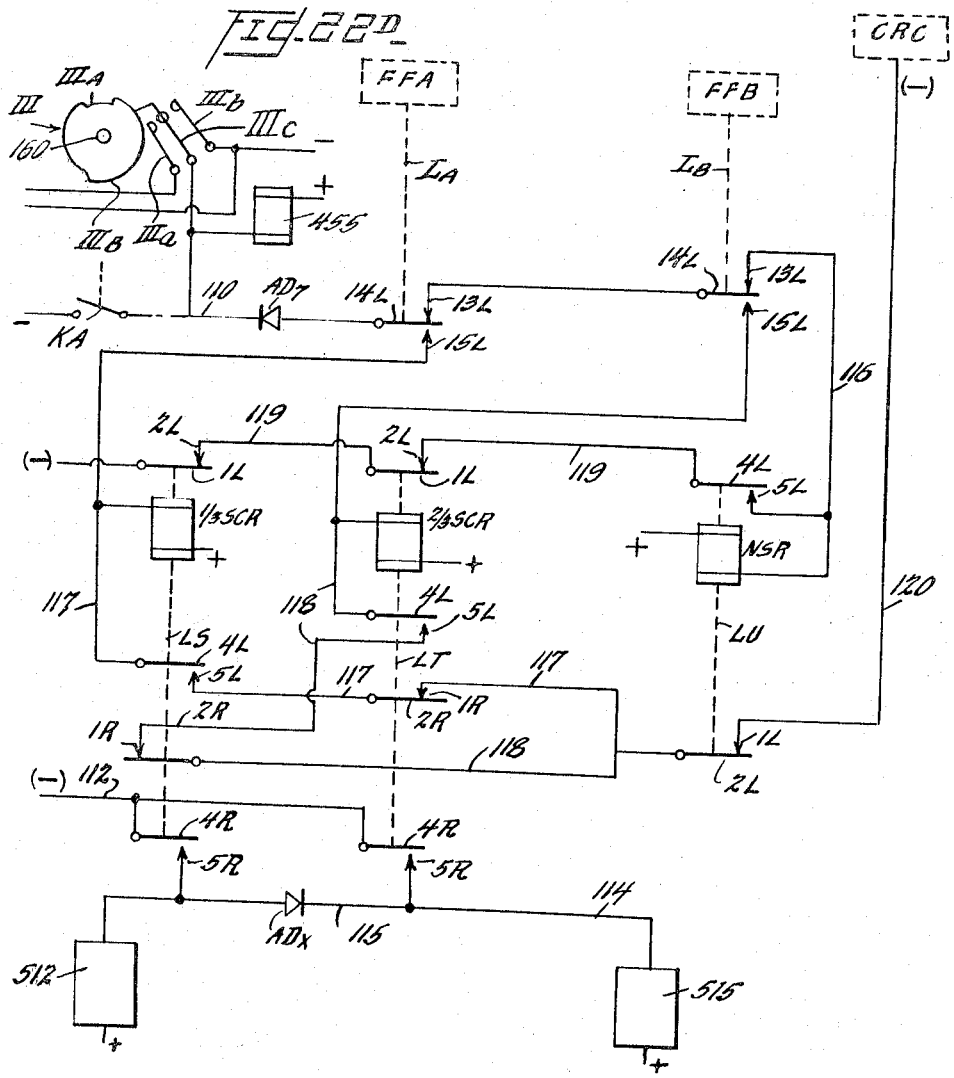

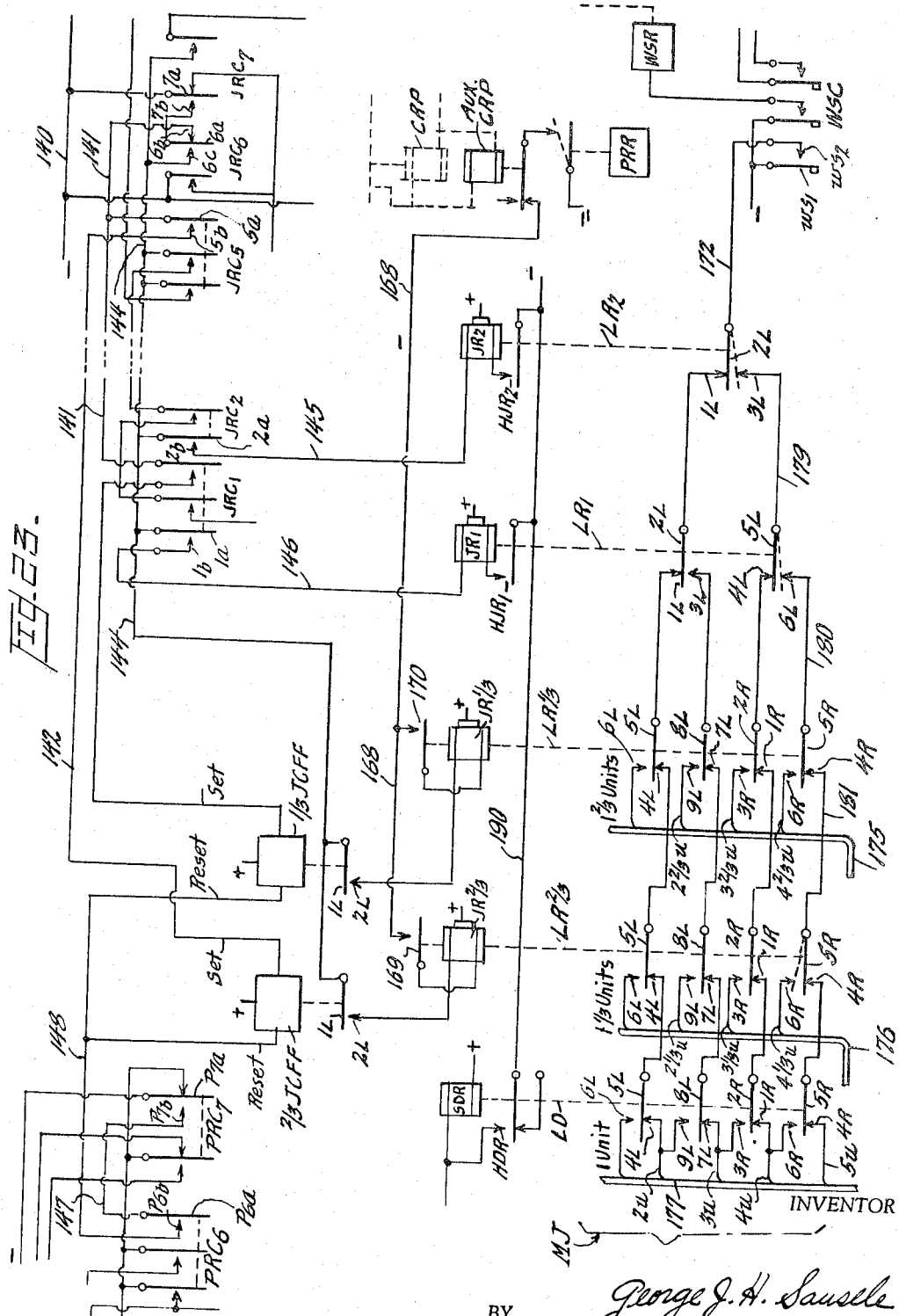

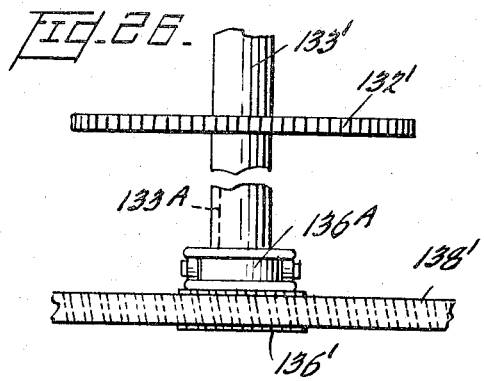
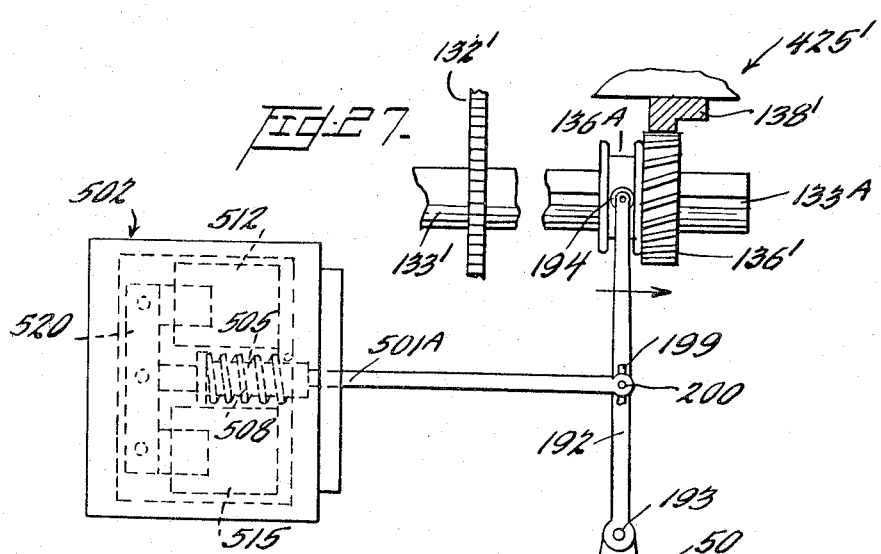
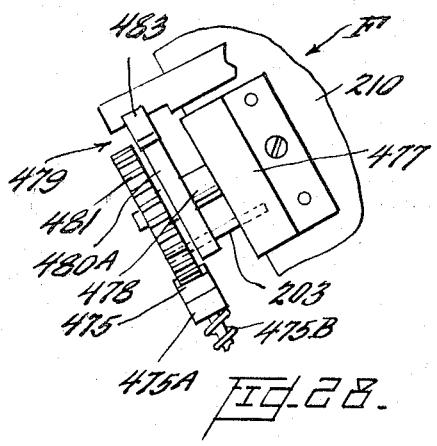
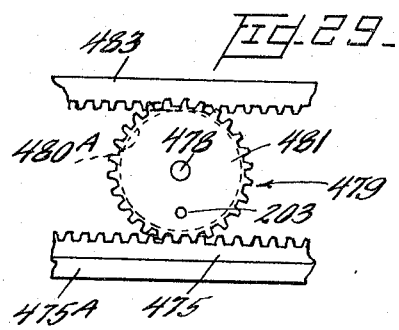

United States Patent Office 3,333,668
Patented Aug. 1, 1967

3,333,668
TYPESETTER SYSTEM AND APPARATUS
George J. H. Sausele, New Providence, N.J., assignor to American Type Founders Co., Inc., Elizabeth, N.J., a corporation of Delaware
Filed June 3, 1964, Ser. No. 372,210
25 Claims. (Cl. 197—20)

This invention relates to text composing systems and components thereof, whether intended for the production of typewritten copy as in the case of the inventions disclosed in the United States patents to Edwin O. Blodgett, 2,700,421, 2,700,445, 2,700,446, 2,700,447, and 2,934,145, or for the production of photo-copy for use in offset or other kinds of printing, as exemplified by the invention disclosed in the United States Patent 3,082,670 granted to George J. H. Sausele.

As in the case of the Sausele patent, the present invention derives much of its basic structure and its underlying operational and control features from the Blodgett developments in justifying typewriters, operable either by keyboard actuation or by means of a coded tape.

Thus, for the basic exemplifications of fundamental elements, mechanisms, and circuitry, much of the disclosures in these Blodgett patents and in the Sausele patent to which reference has been made, are incorporated into this present application by general and specific reference herein; and so far as practicable with the use of identical reference characters. The various departures in any mechanism or elements, modification of structure, circuitry and operation, and other additions and alterations, will be disclosed and explained fully herein as the specification proceeds.

With this basic context in mind, the objects and features of novelty peculiar to the present invention may be set forth as follows.

The general object of the invention is the provision of certain novel and ingenious refinements in the carriage escapement control and operation, whether for character width or word spacing and justification, whereby extremely high quality of fit of characters may be attained.

In the field of type design, efforts are continually being made to improve the appearance of printed text composition, not only with respect to the configuration and design of individual characters but with regard to the arrangement of the composition as a whole, taking into consideration not only character widths and spacing but also word spacing, both normal or basic, and the subtle variations introduced in a line by the justification process.

To the layman or average reader, improvements in type design and arrangement may be readily apparent, both with respect to ease in reading and in esthetic appearance; but it is likely that only expert printers, typesetters, and designers would realize how much the quality of character fit depends upon the ability to subdivide the character width elements into finer fractions.

In the case of the previously mentioned Blodgett and Sausele patented typesetter or composing developments, the basis of character width and character spacing variations is but six units of escapement, effectuated according to the character and spacing codes by the actuation of three escapement members—comprising electromagnets in these examples—set respectively for one, two, and three units of release, either singly or in combination, to yield escapements of one, two, three, four, five, or six units. Each of such escapement members is adapted to control the release of an associated ratchet wheel which is operatively connected with the carriage of the machine, whether it be the keyboard or recorder machine or the reproducer or photo-composing machine.

It would probably occur to an average observer that if more units of escapement were required, additional wheels and escapement magnets could be installed. For example, the provision of four escapement members of three, four, five, and six units respectively, would yield from three to eighteen units, omitting the one, two, sixteen and seventeen units of escapement. A minimum of five escapement members set for one, two, four, eight, and sixteen units respectively, has been suggested, and this set-up would yield consecutive escapement values of from one on up into figures unnecessarily large.

However, the addition of extra escapement wheels and magnets would not only increase greatly the gearing required to be installed in the machines, but also would afford less accuracy in obtaining fine increments of escapement. Such a solution furthermore would be practical only in large typesetter installations and would be much too complicated and cumbersome and expensive for typewriter-style equipment, especially aiming at the same time to maintain the advantages of tabulating, back spacing, and simple carriage return.

Thus the present invention has for a broad objective and purpose the provision of a novel and improved fine incremental escapement for this class of imprinting or composing machines, such as exemplified by proportional spacing typewriters, or photo-composing machines of the type disclosed in the Sausele patent.

In its exemplary or illustrative embodiments, the invention contemplates the provision of a primary escapement device which may be, for example, similar to the set of three escapement releasing magnets and ratchet wheels as illustrated in the Blodgett and Sausele disclosures mentioned, and a supplemental escapement device preferably interposed between a primary escapement mechanism and the ultimate carriage, which device is adapted to apply a correction or fractional alteration to the effect of the basic or primary escapement, to afford a final escapement value to the carriage which may be of selected whole and fractional units. In the embodiments illustrated and described herein, the supplemental escapement modifying means is capable of dividing a full unit of escapement into thirds, thus furnishing a choice of character or space widths among eighteen increments, each increment comprising the distance of one-third of a full former unit.

Now in the use of the equipment disclosed in the Blodgett and Sausele patents referred to, both a keyboard unit and a reproducer unit are involved, and in the application of the principles of the present invention thereto, the actual escapement movement of the carriage for the new finer incremental escapement gradations need be applied to the carriage of the reproducer unit only. The provision for inscribing or photographing the typography of the improved fractional unit or incremental fonts need only to be used on the reproducer; the proof typography in the keyboard units being of any suitable font design or dimensions, and usually the proof sheet used only to give the operator an approximate idea of the ultimate "shape" of the composition. When an accurate location must be determined one-eighteenth "em" is too small a value to be read conveniently on the keyboard scale of a proportionally moving typewriter carriage. Instead, it is more practical to read to one-sixth "em" as units with indicator light, one for one-third unit and one for two-thirds unit to tell the operator his exact location.

However, the incremental or fractional unit escapement provisions do enter into the structure and the functioning of the keyboard unit in relation to the coding of the produced tape for justification purposes; and therefore means are provided in the keyboard unit for modifying the justification coding for any excess fractions of escapement left over at the end of a line, and for carrying such excess over into the reproducer or photo unit to apply it to the first word space of the line to be printed.

Without any intention to limit the scope of the broader patentable concepts of the invention, the structural embodiment to be set forth for illustrative purposes is readily adaptable to the proportional escapement feature of the Sausele Patent 3,082,670, where a primary carriage and a secondary or ultimate carriage are employed, the basic whole unit escapement being applied to the primary carriage and the superimposed incremental escapement being applied to the secondary or actual composition-receiving carriage. More specifically, the two carriages are connected by proportional driving gearing including components comprising intermeshing gears and racks, and the fractional or incremental escapement measure is applied by means of novel electromagnetically actuated means for shifting a "fulcrum" comprising one of the components of the gearing to the fractional distance necessary to properly modify the unit escapement applied to the primary carriage by the basic coarse escapement mechanism.

The fractional or incremental escapement can also be directly applied to a single carriage machine as exemplified in one embodiment illustrated and described herein.

Other objects and features of noveltry including novel circuitry provisions, and the ingenious application of flip-flop relays, for both the totalizing of the fractional units or increments in the keyboard machine and the totalizing and allocation of fractional escapement effects to both the basic unit escapement and the novel incremental escapement mechanisms of the reproducer machine, will be apparent from the following specification when read in connection with the accompanying drawings in which suggestive exemplary embodiments of the invention are illustrated by way of example.

In the drawings:

FIGURE 1 is a view in perspective of a recorder or keyboard machine which is operated to produce a coded tape for actuation of the novel reproducer typewriter or photo-typesetter machine, and also to make a typewritten trial copy of the text;

FIGURE 2 is a similar view of the reproducer, in this example a typesetter, adapted to be operated by the tape producer in the recorder;

FIGURE 3 is a fragmentary view in perspective of portions of the two machines together with a typical control tape shown here for convenience as passing directly from the recorder or keyboard unit, where it has been punched with appropriate codes, to the tape reader of the reproducer or photo-typesetter unit;

FIGURE 3A is a fragmentary view of a tape illustrating a typical line-end coding involved in the novel incremental escapement procedure;

FIGURE 4 is a schematic view diagramming the principal functional members of the two machines and indicating their correlation;

FIGURE 5 is a diagram indicating in whole and fractional units and in increments, the width of a character selected from a given font;

FIGURE 7 is a broken plan view of a code selector device embodying the principles of the invention;

FIGURE 8 is an end view of the selector as seen from the bottom of FIGURE 7;

FIGURE 9 is a vertical sectional view taken on line 9—9 of FIGURE 7;

FIGURE 10 is a similar view taken on line 10—10 of FIGURE 7;

FIGURE 12 is a fragmentary view of a portion of the multiple unit escapement mechanism, showing the escapement shaft, its associated escapement wheels, and the escapement pinion in engagement with the rack on the primary carriage;

FIGURE 13 is a view in vertical section taken approximately on line 13—13 of FIGURE 12;

FIGURE 14 is a vertical sectional view taken on line 14—14 of FIGURE 12;

FIGURE 15 is a fragmentary and somewhat diagrammatic view in rear elevation of a reproducer unit showing portions of a carriage escapement installation for both whole-unit and fractional escapement;

FIGURE 16 is a top plan view of similar fragmentary and diagrammatic nature of the carriage escapement;

FIGURE 17 is a detail view in rear elevation of the actuating magnets and linkages for effecting the applied fractional or incremental escapement;

FIGURE 18 is a vertical sectional view taken on line 18—18 of FIGURE 17;

FIGURE 21A is a diagram illustrating the impressing of the escapement movement upon the film carriage, first upon a unit scale by the regular escapement of the primary carriage, and second by the practically simultaneous shifting of the primary carriage rack to add the fractional unit or incremental escapement factor, if any;

FIGURE 22A is a circuitry diagram showing schematically and somewhat fragmentarily the output of the code selector (illustrated in FIGURES 7 to 10) through the plug-board, where the character code impulses are collected and allocated to the appropriate incremental or fractional unit escapement width control connections, of either the recorder or the reproducer machines;

FIGURE 22B is a continuation of the introductory circuitry of FIGURE 22A, carrying the counting and escapement circuits forward in either machine, and involving certain novel utilizations of flip-flop devices;

Figure 6:
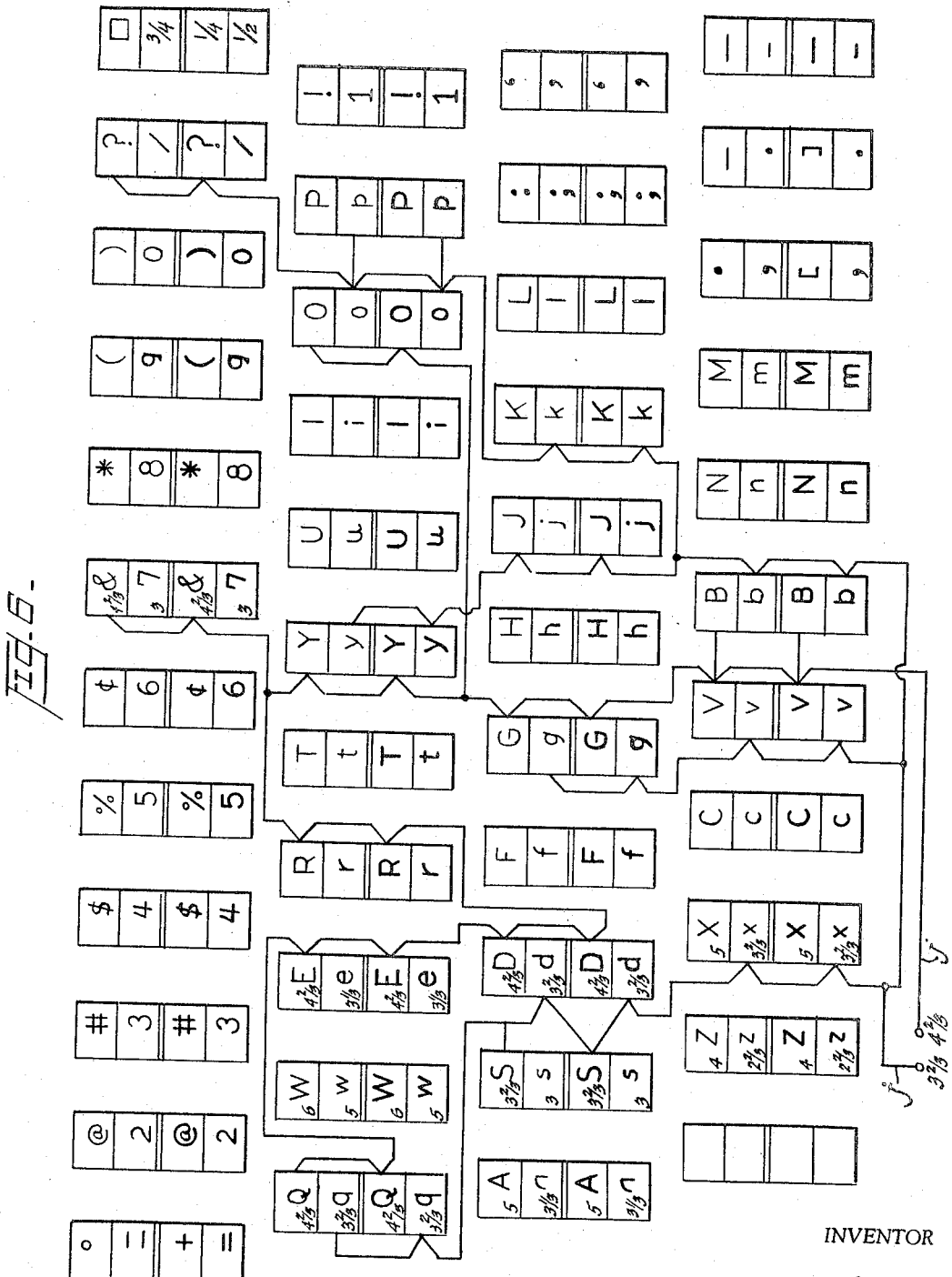
FIGURE 6 is a chart giving the widths in units and fractions thereof of the characters of a suggestive font, in alternative face and in upper and lower case, and showing diagrammatically the bridging circuitry (for example in a plug-board of conventional type) for collecting and allocating the impulses from the code selector for characters of the same widths.

FIGURE 22B$_1$ is a timing chart showing the relative timing of the operation of certain of the flip-flop members;

FIGURE 22C is a circuitry diagram peculiar to the recorder machine and comprising a continuation of the circuitry of FIGURE 22B from the bottom of that figure, and serving to punch certain variants in the line-ending coding for carrying forward the incremental residual plusages to be taken cognizance of in the effectuating of the first word-space in the justified line in the reproducer;

FIGURE 22D is an extension, also from the bottom of FIGURE 22B, but peculiar to the reproducer machine, and adapted to actuate the novel modified carriage escapement mechanism of that machine;

FIGURE 23 is a circuit diagram involved in the justification correction necessary in the reproducer or photo-unit in adapting to the fractional unit or fine increment feature of the present invention;

FIGURE 24 is a chart giving the tape coding to accompany the justification code at the line end to indicate the width of the first word space of the reproduced line and the reduction for certain subsequent spaces;

FIGURE 25 is a chart giving the tape coding for the point at which the reduced word spacing is to start;

FIGURE 26 is a fragmentary view in plan of the escapement rack and pinion of another embodiment of the invention;

FIGURE 27 is a fragmentary view in elevation (partly in vertical section) of the same embodiment, and showing schematically one way of applying the fractional or incremental escapement;

FIGURE 28 is a fagmentary view in end elevation of the escapement rack and a modified interchangeable gearing unit capable of applying the fractional escapement in still another way; and FIGURE 29 is a fragmentary view in rear elevation of the same modified unit.

It will be recognized that the recorder or keyboard machine illustrated in FIGURE 1 and the reproducer exemplified in FIGURE 2 correspond to the similarly designated units of the typesetter system of the Sausele patent, and similarly the tape handling devices, including the tape punch 15 and the tape code reader 16, of FIGURE 3, are of the same nature. The matrix disc of the Sausele reproducer is indicated at D in FIGURE 2; and the respective keyboards of the recorder and reproducer are designated 10A and 10B (or generically as 10 in FIGURE 4).

In these figures, the trial copy recorder or keyboard machine is given the general designation A and the reproducer unit is denoted by B. The unit A is operated manually by means of the keyboard 10A to make a typewritten copy of the text material, which will of course give a very good indication of the normal length of the lines. The keyboard mechanism, including the power cylinder and the linkages to the type bars, is shown in FIGURE 3 of Blodgett Patent 2,700,447 in the case of the recorder unit, and as adapted for the reproducer these parts are shown schematically in FIGURE 4 of the Sausele Patent 3,082,670 which is repeated as FIGURE 4 of the present application with appropriate modifications peculiar to the present development.

During this typing, a tape, designated 11 in FIGURES 3 and 3A of the present drawings, is punched with successive series of perforations, the number and position of the perforations at each point comprising a coded representation of a character, a space, or one of several other functional machine operations pertinent to the making of the desired type composition. At the trailing end of each line in regular text composition, a justifying code is also punched into the tape which directs that that line be expanded or contracted to the desired length upon reproduction on the typesetter or B unit, and also provides for return of the carriage.

The basic tape punching mechanism is indicated at 15 in FIGURES 1, 3 and 4 of the present application and the above-mentioned Sausele patent; and the general nature, construction and function of the punch is fully described in Blodgett Patents 2,700,421 and 2,700,447, particularly in FIGURE 35 et seq. of the latter patent and portions of its specification especially from column 24 to column 38 therein.

The tape punch 15 is actuated electrically from contacts operated by a code selector device in the recorder unit A, this code selector having its counterpart also in the reproducer unit B. In the schematic view comprising FIGURE 4 of the drawings, the code selector (which may exemplify these devices for either the recorder or the reproducer or typesetter unit) is designated generally by the reference character 13. The construction and operation of a basic type of code selector for the recorder is fully set forth in Patent 2,700,447 in FIGURES 63–66, and in the most appropriate portions of the specification of the Patent 2,700,447 comprising columns 22–24.

For operating the typesetter or reproducer unit B, the punched tape 11, edited and corrected if necessary, is fed into the combined tape reader 16 of the unit B (see FIGURES 2 and 3) which tape reader includes a print reader portion and a justification reader portion indicated respectively in the Sausele patent as 16P and 16J, and they will be so referred to herein. The basic details of these readers are clearly disclosed in the Blodgett patents, most particularly in Patent 2,700,447, FIGURES 51–56 of the drawings, and columns 38–43 of the specification. The print reader common contact RCC is shown in FIGURE 54 of the Blodgett patent and is reproduced in FIGURE 4 of the present drawing.

As clearly explained in Blodgett Patent 2,700,447, and as practiced in the patented Sausele arrangement, the justification code is read by the justification reader first, even though it occurs at the trailing end of the line on the tape, and the mechanism and circuits are so interlocked as to perform their functions in the proper coordinated sequences, the justification reader section always finding the justification controls for each line before the printing reader starts reading that line. With this arrangement, there will be a loop in the tape 11 between the justification reader or back reader and the forwardly located print reader as shown in FIGURE 3 of the present drawings.

The information gleaned from the tape by the print reader is transmitted electrically by the selective actuation of switch contacts (FIGURES 52–55 of Patent 2,700,447) to the code translator, designated 14 in FIGURE 4 of the present drawings, and in the patents mentioned. This arrangement is disclosed in detail in Blodgett Patent 2,700,447 in FIGURES 57–62 and in columns 43–47 of the specification. The various combinations of magnet actuation in the selective shifting of the permutation bars PB1–6 in that patent ensure that one and only one of the seekers 489 move into position to be operated by the seeker operating bails 530 and the positioning bail 523. The seekers are each associated with a character key or other functional key of the keyboard 10A, and are adapted to actuate that particular key by means of the hooked upper end 490 of each of the seeker bars.

Referring now to FIGURES 3A and 63–66 of Blodgett Patent 2,700,447, and more particularly to lines 7–42 of column 24 of that patent, it will be understood how the code selector 13 is actuated from the key operating cams to selectively energize the character space selecting escapement magnets designated EM1, and EM2, and EM3 in that patent, and corresponding to those designated LE1, LE2, and LE3 in the Sausele patent and in the present application. Six switches ECA, ECB, ECC (for lower case operation) and ECE, ECD, ECF (for upper case operation) serve to energize the escapement magnets in Patent 2,700,447, and these switches find their respective counterparts in switches SE7, SE8, SE9, SE10, SE11, SE12 in the circuitry diagrams of the Sausele patent. Thus through the code selector 13, the particular carriage escapement for each character was appropriately provided for, but only in variations among six units. The novel modifications afforded by the present invention for more minute sub-divisions will be described in detail in connection with FIGURE 4 and other figures of the present application.

The variable escapement mechanism of the basic machine shown in the Blodgett Patent 2,700,447 is best disclosed in FIGURES 14–18 and 69 and in columns 13–15 and 50 et seq. of that patent, and it will be readily understood how the three escapement magnets, energized singly or in various combinations, were made to release the carriage for different selected distances of travel to accommodate character widths of six differents sizes, and also to effect escapement for word spacing and any other requirement for forward carriage movement.

Further in regard to the justification feature, it will be recalled how the justification code reader 16J registers the variable spacing information for a given line of compositon before that line is read by the print-reader 16P, and is therefore prepared to allocate word spaces at different points along the line of the necessary widths to attain justification. The mechanism and circuitry involved in computing these justification allocations in the recorder A are set forth in FIGURES 40–50 and columns 30–34 in Patent 2,700,447; and the interpretation and application of the justification data to the escapement of the reproducer B is explained in columns 43, 47–53, with reference to FIGURES 51–56 and to the diagrams of FIGURES 70–73 of that patent.

Among the remaining basic functions to be traced from the Blodgett and Sausele patents are the carriage return provisions, and the initiation and powering of this function as it applies to the parent Blodgett machines is set forth particularly in columns 15–22 of Patent 2,700,447.

In order to fully understand the present incremental escapement invention, a familiarity with the line ending coding and resulting operation of the Blodgett system is desirable. For this purpose, reference is made to FIGURE 73 of Patent 2,700,447 and columns 36, 37, 38, 47, 48, 49, 50, 51, 52, and 53 of the specification of that patent, where the significance of the interlock code "7," and the "76" code which accompanies the usual justification code, and the carriage return code "356," are described. Similar accounts are to be found in Patents 2,700,421, 2,700,445 and 2,700,446.

In summary then, we may conclude that in the case of the basic A and B machines, two principal measuring or sizing phases are gone through: first, the prescribed escapement distance for a given character is assigned by the code selector 13, through the corresponding combinations of the unit-escapement magnets LE1–3 by the actuation selected ones of its switches SE7–12; and secondly, the justification of the line of type is prescribed by the line-end coding phase "76" followed by appropriate combinations of the five unit justification code, as explained in columns 50–53 inclusive, and the two smaller charts of FIGURE 50 of the Blodgett Patent 2,700,447, which charts are reproduced as FIGURES 24 and 25 herein.

FIGURE 73 of the Blodgett Patent '447 gives an example of a typical line ending. The interlock code "7" will be punched in the tape. Then the "76" code will be punched along with the specific justification code "14," which means, of course, that the starting word space will be three units and reduced word spaces two units, and that the word spacing reduces after the third word space. Then follows the punching of the carriage return code "356."

All of this, of course, implies the actuation of the correspondingly numbered punch magnets PM7, 6 . . . 1 in the recorder and the operation of the corresponding print reader contacts PRC7 and PRC6 and the justification reader contacts JRC7–1, as fully shown and described in the Blodgett patents.

Now the escaping of fractional units in accordance with the present invention will not only call for a modification of the code selector mechanisms and circuitry, but will also require an adjustment of the word space allocations in the graduated successively reduced spacing involved in the justification procedure. These ingenious improvements comprise specific features of novelty of the present invention and will now be described in detail in connection with the physical structure of the actual carriage escapement mechanism and other cooperating elements.

The selector device 13 for the present purposes is somewhat more complicated than the selectors of the Blodgett and Sausele patented installations, each selector slide operating its own switch directly to energize appropriate circuitry to feed unit integers to the basic escapement mechanisms LE1–3 and fractional units or increments (one-third of a unit in this instance) to supplemental mazes for (a) carrying of surplus fractional units or increments forward from the keyboard or A unit, and for (b) effectuating the modified or corrected actual carriage escapement in the producer or B unit.

A chart showing the units of width allocated to the characters of one exemplary font, together with a partial diagrammatic suggestion of the collection of leads from the code switches for characters of the same incremental widths (as for the purpose of designing a plug board, such as designated in FIGS. 4 and 22A as PB, to be interposed in the circuitry from the code selector 13 to the full-unit and the fractional-unit escapement devices) is depicted in FIGURE 6 of the drawings.

In this diagram only the jumpers j for the bridging or plugging in of the three and two-thirds (3⅔) unit characters and the four and two-thirds (4⅔) unit characters have been suggested, but it will be readily understood how the plugging of other common widths can be accomplished by other jumper wiring. Incidentally certain portions of the plug-board section of the circuitry can be omitted to eliminate the fractional or incremental escapement effect and revert to whole-unit escapement, whenever desired.

A plug-board of the nature to accommodate the forty-four characters depicted in FIGURE 6, in two fonts and in upper and lower cases, would require one hundred seventy-six input sockets, all jumpered according to size of individual characters to the eighteen output sockets representing the eighteen increments into which the six basic escapement units are divided.

It will be understood that in the case of the present development the code selector, unlike the interchangeable ones of some earlier typesetter installations, may comprise a permanent component, and changes in font design accommodated by either substituting plug-boards or rearranging the jumper wires.

A code selector device 13 appropriate to this invention will now be described in some detail in connection with FIGURES 7–10 of the drawings and contrasted with the old code selector device illustrated in FIGURES 29–32 of the Blodgett Patent 2,700,447. The code selector 13 comprises a supporting frame having side frame members 20 and 21, the side frame members being connected by cross bars of a configuration peculiar to the installation of the other elements, these bars being designated 22 and 23.

The forward and rear cross bars 22 and 23 may have at least their upper portions notched to provide comb-like structures for guiding the selector slides and maintaining them in uniformly spaced positions as in the case of the equivalent Blodgett structure.

The alternately disposed selector slides are designated by the numerals 25 and 26, the longer slides 25 being illustrated to best advantage in FIGURE 9 and the somewhat shorter slides 26 depicted in FIGURE 10, FIGURE 10 of course being as viewed in the opposite direction from FIGURE 9. All of the slides 25 and 26 have upwardly extending projections 28 and 29 respectively at the same end of the code selector 13 for selective actuation by the power-actuated cams, one of which is shown in the diagram of FIGURE 4 at 30. Suitable confining strips for maintaining the slides in proper position are suggested at 31.

Referring again to FIGURES 29–32 of the Blodgett Patent 2,700,447 and to the appropriate figures in the present application, it will be seen that the structure and function of the lower set of seven contact shaft assemblies 280 together with their upstanding contact elements 284 are retained, these shaft assemblies being actuated by the bails 274 which are in turn moved by the cam projections 285 on the slides 25 and 26. These actuators are adapted to close the contacts SC for the circuits to the punch magnets in the punch assembly 15 (see FIGURE 4), for punching the appropriate coding in the tape 11.

However, for measuring and controlling the escapement value assigned to each character, the slides 25 and 26 are adapted to directly actuate their own contacts, and assuming that there are in the neighborhood of forty-four selector slides to accommodate all of the characters, there are forty-four of these switches. In order to economize space the switches actuated by the several slides 25 and 26 are best disposed in alternating positions as shown in FIGURES 7 and 10, the switches assigned to slides 25 being designated 35 and those assigned to slides 26 as 36. Switches 35 and 36 are mounted on cross channel strips 37 and 38, respectively, these strips spanning the breadth of the selector 13 between the side frames 20 and 21.

Each of the slides 25 has a headed pin 40 on the upper edge thereof and the slides 26 are provided with similar headed pins 41 in similar relative positions. Straddling these respective actuating pins are the notched links 45 and 46 of non-conducting material, and the upper ends of these links are pivotally connected as at 47 with one contact 48 of the respective switch assemblies and it will be readily seen how the horizontal movement of the selector slides 25 and 26 causes the angled links 45 and 46 to close the contacts of the switches 35 and 36.

A bus lead (shown at 70 in FIGURE 22A) supplies minus (−) D.C. current to one contact of all of these switches, and the other contacts are led off in multiple conductor cables from the code selector device 13 to the escapement circuitry illustrated in FIGURE 22A.

One of the slides (in this embodiment one of those longer ones designated 25) is a word space slide and carries a set of three switches as shown in FIGURES 8 and 9, these pairs of contacts being designated 35a, 35b, and 35c. These contacts are represented in the circuitry diagrams as WSC. The link which actuates these switches is designated 45′.

Figure 11:
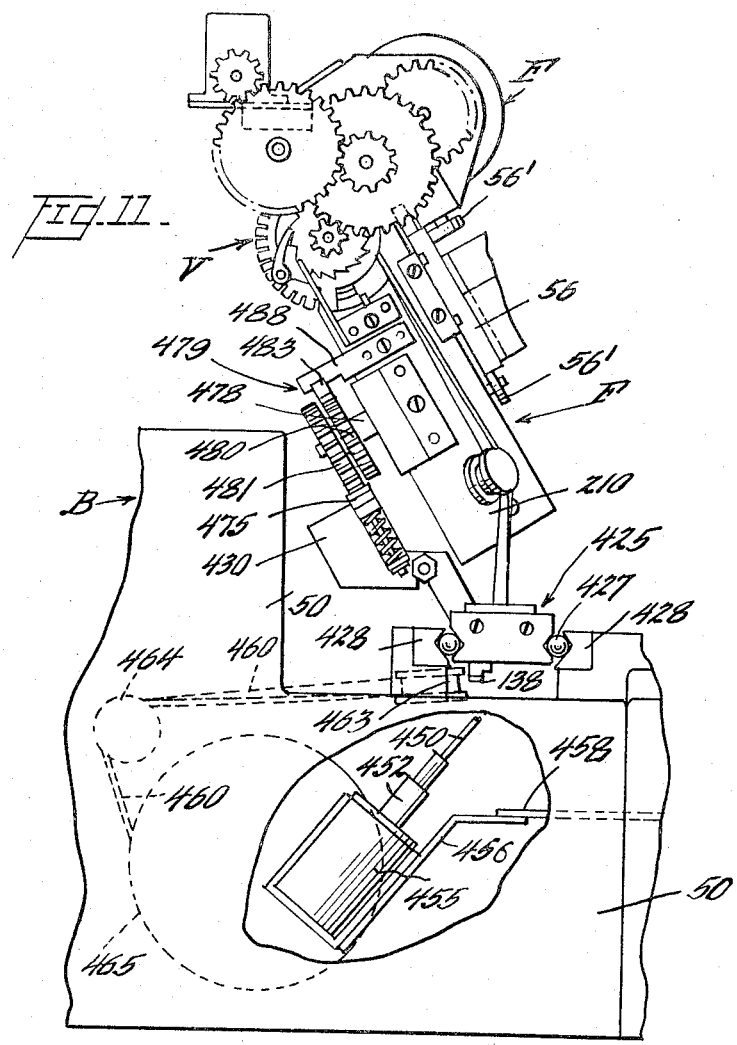
FIGURE 11 is a fragmentary view in side elevation of a reproducer unit typical of those usable in pursuing the present invention.

At this point it would be well to describe the mounting and movement of the carriage of the reproducer or B machine, preparatory to introducing the supplemental incremental escapement features. FIGURE 11 of the drawings is the counterpart of the central portion of FIGURE 6 of the Sausele patent mentioned above and shows the base frame 50 of the B machine in fragmentary elevation with the ultimate film carrying carriage F rising above the base structure. The primary skeletonized carriage is shown at 425, which carriage is grooved upon either side for the reception of the anti-friction bearings 427 by means of which it may slide with ease in the tracks 428 carried by the main base frame 50 of the machine.

The film carriage F which is movable with relation to the primary carriage 425 is mounted for movement along the guide rail 56 of the fixed superstructure by means of the small wheels 56′. The carriage 425 is provided adjacent its ends with angular upwardly extending side frame members or brackets 430 and 431 which carry certain elements which proportionate the movement applied to the base carriage 425 in applying it to the film carriage F; and, as will be described presently, this movement may be adjusted and controlled for fractional alterations in the unit escapement for different characters and spacing.

The means for urging the base carriage 425 along its track, subject to the escapement controls, comprises a tape 460 which may be secured to the rack member 138 of angle section depending from the carriage 425. From its point of securement 460a to the rack 138, the tape 460 extends along the carriage to the left-hand end thereof and then passes around a guide roller or pulley 463 and from there to a pulley 464 and thence around the spring-wound tape drum 465, the drum being suitably mounted within the confines of the main frame 50.

Much of the showing of FIGURE 11 is not concerned with the present invention and it will be sufficient to indicate the film-winding or line-spacing mechanism by the general reference character V. Other portions of the escapement modification shown in this figure will be adverted to presently in connection with other more detailed figures of drawing.

Before reverting to the carriage movements, particularly as illustrated in FIGURES 15 to 22, the primary unit-escapement means as applied to the carriage 425 will now be described briefly in connection with FIGURES 12, 13, and 14 of the drawings, this mechanism being substantially the same as that employed in the Sausele patented structure. These figures correspond to FIGURES 38, 38A, and 39 of the Sausele Patent 3,082,-670 and where feasible, the same reference characters will be employed as in that patent, but without the primes.

Thus, the general framing of this portion of the structure is indicated at 127 and comprises a portion 134 and the upper frame plate 197. The ratchet escapement wheels are shown at 130, 131, and 132, mounted upon and geared to the escapement shaft 133. Other elements to be seen in these figures and which correspond to similar elements in the Blodgett Patent 2,700,447 in FIGURES 14 and 16, are the loose dogs 161, the dog rocker plates 195, their lugs 203, and the resilient stops 206 and 207 mounted on the adjustable arms 208 and 209. All of these elements function as fully described in the Blodgett Patent 2,700,447 particularly in columns 13–15 thereof and need not be set forth in detail herein.

Projecting to the left in FIGURE 12 from beneath the frame plate 197 are portions of the rocker plates 195 comprising the escapement dog carrier assembly. The projecting portions of arms 195 are connected to a part of the fixed frame portion 127 by means of the springs 440 which serve to urge the several rocker assemblies into normal idle association with the escapement ratchet wheels 130, 131 and 132.

Dog carrier arms 442 also extend from the rocker assemblages into the path of movement of the trip slide member designated generally by the reference numeral 445 and comprising an angle plate having a flange 446 upon which are adjustably mounted the studs 447. A slide member 445 is suitably supported by a portion of the frame 127 and the other flange 448 thereof is connected as by means of the bell crank 449 with the link 450 connected to the core 452 of the escapement solenoid 455, which as shown in FIGURE 11, may be carried by a bracket 456 secured to a fixed portion 458 of the base frame 50.

As shown in FIGURE 13, the armatures of the escapement magnets LE1, LE2, and LE3 are connected by the linkage designated generally by the numeral 470 to the corresponding dog carrier arms 442, which are adapted to be depressed and interposed in the path of the corresponding studs 447 of the slide member 445, and the escapement is set for actuation.

Then when the solenoid 455 is energized, the trip slide 445 is moved against the resilient resistance of the coil spring 457′ which connects a pin 458′ on the fixed frame with a pin 459 on the slide, so that the studs 447 contact such dog carrier arms 442 as have been depressed by the selective actuation of the magnets LE1, LE2, or LE3. (See FIGURES 12 and 13.) Those dog carriers 442 and the rocker assemblies 195 to which they are connected are thus swung in a direction to effect the appropriate escapement movement of the respective escapement ratchet wheels 130, 131 and 132, by the inter-action of the dog and stop elements as described in more detail in the Blodgett Patent 2,700,447.

The escapement shaft to which the wheels 130, 131 and 132 are geared is shown diagrammatically at 133 in FIGURE 12 and in cross-section in FIGURE 13. The shaft carries a pinion 136 which meshes with the primary carriage rack 138.

Now referring more particularly to FIGURES 15 and 16 of the drawings, which present aspects of the carriage connections as viewed from the rear of the machine, it will be seen that the box-like film carrying portion 210 of the film carriage F is shown as riding upon the track or guide rail 56, this element projecting from both ends of these figures.

Since the bar or rail 56 is integral or fixed to the main frame 50 of the machine, it presents a convenient point for the support of the fixed escapement rack 483, one end of the rack being secured as by means of the fastening elements 60 to the stub element 61 which is in turn secured at 62 to the bracket 65 rigid with one end of the guide rail 56. A hold-down element such as suggested at 488, may be secured to the box frame 210 to maintain the fixed rack 483 in mesh with the gear element 481 of the interchangeable gear set 479, the other element 480 of which meshes with the lower rack 475 carried by the primary or skeleton carriage 425.

The primary carriage 425 comprises certain transverse framing elements 429 which connect the two end frames 430 and 431. The primary carriage rack 138 comprises a portion of this transverse framing and is shown clearly in FIGURE 15 as being in mesh with the escapement gear or pinion 136 and urged toward the right in the direction of the arrow T' by means of the tape 460. The side frame elements 430 and 431 are also connected by the margin rack indicated at 191.

Extending from side to side of the carriage 425 at the upper portion thereof is the movable escapement rack 475, the rack proper being preferably supported upon a bar 475a which is guided upon the right-hand frame 430 to mesh with the gear 480 of the interchangeable set, and the rack itself is yieldably urged toward the gear by means of the spring 475b surrounding the post 475c which serves to urge the rack 475 toward the gear. This spring-pressed device is carried by the bracket 475d secured to the frame member 430. The opposite end of the movable rack 475 is secured as by means of the pin 500 to the rod 501 which projects from the escapement solenoid housing 502 bolted as at 503 to the frame element 431.

For a more complete presentation of the supplemental carriage escapement solenoid assembly, reference is made to FIGURES 17–21 of the drawings. The rod 501 comprises an extension of the shaft 505 carrying a stop shoulder 506, a coil spring 508 being compressed between the shoulder 506 and the wall 509 of the casing 502 in order to continually urge the escapement rack 475 toward the left in the figures under discussion. The left-hand end 510 of the shaft 505 may be guided within an opening in the rear wall 511 of the housing 502.

Secured within the housing 502 are the two solenoids 512 and 515. An armature or plunger 513 moves within the solenoid 512 and a similar plunger 516 is disposed in the solenoid 515 for movement therein. A yoke member 520 having three pivots 521, 522, and 523 is arranged for floating within the housing 502, the end portions of the yoke 520 being connected to the respective plungers 513 and 516 by means of the pivots 521 and 523 and the center portion of the yoke 520 being pivotally connected to the rod shaft 505 near the end thereof as at 522. The yoke member 520 may consist of two parallel plates 520a and 520b as suggested in FIGURE 18 of the drawings.

Leads from the electrical circuitry which will be presently described, are brought into the casing 505 as by means of the cable suggested at 525.

Now ordinarily, and in accordance with the operation of the Sausele patent mentioned above, the rack 475 would be rigid with the primary carriage 425 and would transmit the proper degree of escapement to the film carriage F, 210 through the interchangeable gearing 479, the carriage partaking of the resultant bodily movement of the gearing 479. It is to be noted that in this particular illustration the two gears 480 and 481 of the set 479 are of equal diameter and thus no specific proportioning is introduced at this point. With the rack 475 fixed with relation to the carriage 425 the rack 483 acts as a fulcrum and the extent of movement applied to the film carriage and the axle 478 of the gear set is half that of the movement of the carriage 425 and rack 475, and furthermore, the movement is in whole units rather than fractional units or increments.

Now through shifting movements applied to the rack 475 upon the primary carriage 425 by means of the fractional escapement solenoids, the extent of such added fractional amounts of escapement to the gearing 479 and thus the film carriage may be determined. The dimensions of the various parts are so chosen in this particular embodiment that one-third of a unit or two-thirds of a unit can be added to the basic escapement within the six unit system to give a choice among eighteen fractional units or increments, each increment being one-third of a unit.

Figure 19:
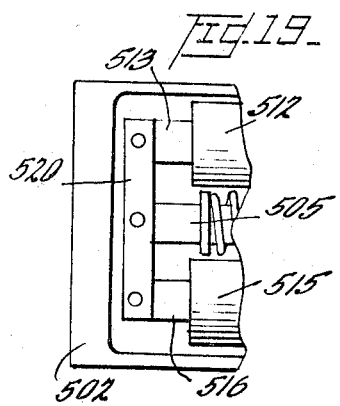
FIGURES 19, 20 and 21 are diagrammatic fragmentary views similar to FIGURE 17, illustrating three possible positions of the magnetically controlled device for applying the incremental escapement movements to the carriage rack.
Figure 20:
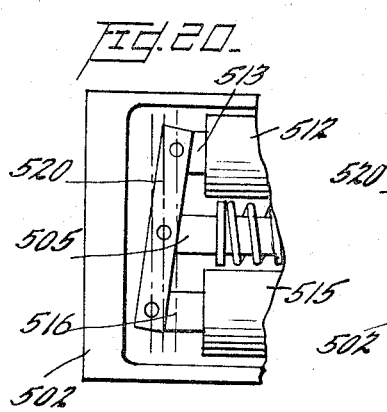
Figure 21:
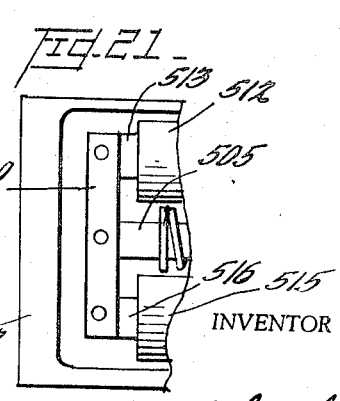

Thus, the solenoid 512 is designated the one-third unit solenoid and the solenoid 515 is designated the two-thirds unit solenoid. Referring now to FIGURES 19, 20 and 21, it will be seen that if the solenoid 512 alone is energized its armature or plunger 513 will be drawn toward the right as in FIGURE 20 a given distance which will cause the rack shaft 505 to move half of that distance and thus shift the movable rack 475 such a distance, toward the right as viewed in FIGURES 15 and 16, as would cause the gear set 479 and thus the film carriage to move one increment or one-third of a unit further toward the right.

Now, if the machine is in a state where the 512 solenoid is energized and if a character is called for which requires an additional fractional one-third of a unit, both solenoids 512 and 515 will be energized and the lower plunger 516 drawn toward the right, and the rack shaft 505 and the rack 475 move an additional one-third fractional unit toward the right.

On the other hand, if the unit measure of a character is an integer involving no fractions, neither the state of the one-third unit solenoid 512 nor the two-thirds unit solenoid 515 will be changed, and the shaft 505 and rack 475 will remain in the same position.

In FIGURE 21A there is shown graphically the effect of the application of a fractional escapement to the film carriage as called for by a character of a width corresponding to say two and two-thirds units. A full two unit escapement will of course be afforded by the escapement magnet LE2 acting through the escapement wheel 131 and serving to escape the primary carriage 425 the distance a. Then practically simultaneously through circuitry yet to be described, both solenoids 512 and 515 will be energized and the shaft 505 and rack 475 will be moved to the positions indicated in FIGURE 21 which will add another two-thirds of a unit to the movement of the film carriage, this added movement of the primary carriage being indicated as b, and the two integer and fraction movements of the film carriage being indicated at c and d respectively. In the diagram of FIGURE 21A the fixed rack initial fulcrum point is suggested at x, the initial center of the gear set 479 is shown at y and the initial point of tangency of the gears with respect to the movable rack is indicated at z. The final position of the gear set 479 after the application of both the integer escapement and fractional escapement is suggested at broken lines in FIGURE 21A.

Now that the most pertinent structural portions of the machines have been described, the operation of the device will be more apparent from a description of the novel electrical circuitry involved in the recorder for both the totalizing of the fractional escapements and the transmission of any fractional overage, whether one-third unit or two-thirds unit, from the recorder to the justification system of the reproducer; and in the reproducer for both the actual effectuation of the fractional or incremental escapement in the film carriage for each character through the mechanism just described, and the effectuation of any required alteration in the first word space of a line.

First of all, it would be well to trace the actuation of the recorder machine in storing or keeping account of the accumulation of increments or fractional units during the punching of the line of composition in the tape, and recording the final overage in fractions of a unit for transmission to the justification system of the reproducer for trimming the first word space in accordance with such fractional overage.

Referring to FIGURE 22A of the drawings and tying it up with the code selector illustrated in FIGURES 7–10 of the drawings and also to the circuitry of the Blodgett system as disclosed in FIGURES 70 and 70A of the Blodgett Patent 2,700,447, the bus lead supplying minus (—) D.C. current to the code selector is designated 70, and connection is made to all of the selector switches 35 or 36 of the code selector 13. In the example illustrated, there will be forty-four of these switches, but only three of them are shown in the curtailed or fragmentary diagrams of FIGURE 22A.

It would be well to interpolate at this point that in accordance with the provisions of the Sausele Patent 3,082,670, provision is made for shifting not only from upper case to lower case but for shifting from one font to another in the character image projecting system. Thus, choice may be made between upper and lower case characters of two different fonts. Referring back to the diagrammatic FIGURE 6, it will be noted that the character width representations for both upper case and lower case of the two different fonts are indicated (for a representative number of the characters), and provision is made, in connection with the leads from the code selector 13 and the width allocations afforded by the plug-board mentioned in connection with that figure, for selecting between upper and lower case and primary or secondary font. Coming back now to FIGURE 22A, a case shift relay CSR and a font shift relay FSR are established and adapted to be energized from appropriate keys on the keyboard, possibly in some such fashion as the relay RF in FIGURE 40A of the Sausele patent as influenced by the case shift switch 735 or the font shift switch 750 of that patent.

The case shift relay serves to actuate the switches $c1$, $c2$ and $c3$, when energized, to break the contacts at $c4$, $c5$, $c6$ and establish contacts at $c7$, $c8$, $c9$, to divert the flow of current from say lower case character width values to upper case character width values. Now the lower case circuit from contact $c4$ leads to the switch $f1$ and the upper case contacts $c7$ to the switch $f2$. The lower case contacts $c5$ from the second character selector switch 36 leads to the switch arm $f3$ and the upper case contacts $c8$ from this character selection leads to the switch $f4$. Of course, similar arrangements are made for all of the forty-four selector switches throughout the code selector assembly.

Then the font selector relay FSR when actuated to shift to a secondary font from the normal primary font moves the switches $f1$, $f2$, $f3$ and $f4$ downwardly, breaking the upper contacts $f5$, $f6$, $f7$ and $f8$ and making the lower contacts $f9$, $f10$, $f11$ and $f12$.

Following this tree circuitry further, it will be seen that the lower case primary font contact $f5$ leads to the plug socket $p1$; the lower case secondary font contact $f9$ goes to the plug socket $p2$; the upper case primary font contact $f6$ leads to the socket $p3$; the upper case secondary font contact $f10$ leads to the socket $p4$, thus distributing the four case and font variations of the character controlled by the first code selector switch 35.

Similarly, the character appropriate to the code selector switch 36 when neither the CSR or the FSR relays are energized sets up the leads for lower case primary font from contact $f7$ to the socket $p5$. Then, the same character in lower case secondary font would pass from contact $f11$ to socket $p6$; the upper case character of primary font would go from contact $f8$ to socket $p7$, and the upper case secondary font circuit would run from contact $f12$ to socket $p8$. Similar connections throughout the entire forty-four switches on the code selector 13 would be brought into a series of at least one hundred and seventy-six sockets on the plug-board PB.

Perhaps the best way to explain the arrangement and operation of the flip-flop relay storage and totalizing system would be to carry through one or more character impulses representing characters of different fractional widths, and then see just what happens with respect to the whole unit escapement control for the recorder carriage and the storage, totalizing, and carry-over of the one-third and two-thirds fractional units.

Referring to FIGURE 22A, let us assume that the first switch 35 in the code selector 13 represents the character Q. Then tracing this character through the case shift switching for lower case and through the font shift switching for primary font, we come out at the contact $f5$ which leads to the socket $p1$ on the plug-board PB. It will be noted that the proper size in this particular font for lower case primary font $q$ is one and one-third units (or four increments) and this is effected by one of the jumper wires $j$ leading from the lead-in socket $p1$ to the lead-out socket $b4$. (It is to be noted that this represents a different font style than that suggested in the example illustrated in FIGURE 6.)

It will be noted that if both the case shift relay CSR and the font shift relay FSR are energized, the circuit from the Q switch 35 is through contacts $c7$ and $f10$ leading to socket $p4$. The jumper wire $j$ connects in socket $p4$ with the out socket $b14$ of the plug-board which gives the width of upper case Q of the supplemental font as fourteen increments or four and two-thirds units. Lead-out sockets for other appropriate increments or units are indicated in FIGURE 22A at ($B_0$ to $B_{18}$) ($1u$ to $6u$).

Now, following through the one and one-third circuitry for the lower case primary font $q$ the wire 75 leads into FIGURE 22B and branches at the connection 76, one extension 77 leading on through the diode $d2$ toward the right to eventually connect with the primary escapement magnets LE1 or LE2 depending upon the accumulation of fractional units or increments at the time.

The branch 78 of the one and one-third unit wire leads downwardly to the diode $s2$ which is one of a series of diodes $s1$–$6$ into which lead all of the wires representing widths ending in one-third of a unit. Beyond the diodes these circuits are joined into a common lead O which through certain circuitry to be described ultimates in a "Set" lead into the "one-third" flip-flop assembly FFA.

Now before describing the flip-flop circuits in detail, the lead for the upper case secondary font character Q can be brought up to a similar point. From the socket $b14$ of the plug-board PB a line 80 moves into the circuitry of FIGURE 22B and branches at the connection 81 one branch 82 entering the flip-flop actuated circuitry through the diode $e5$. Another branch 83 leads downwardly to the diode $t5$ which is one of a series of diodes $t1$–$6$ from which leads are collected into the bus T which eventually arrives at the "set" line for the "two-thirds" flip-flop relay system FFB. (It will be understood that only those elements in the circuitry involving the examples traced are specifically set forth herein; it being obvious that the other diodes, switch points, etc. are appropriately designated in proper relationship to the units or increments involved.)

At this point it would be well to reiterate that the actual escapement for the recorder machine is not accomplished in increments or fractional units but in whole units; therefore, the actual typewritten proof copy from the recorder will not represent the individual characters as properly spaced, but will on the other hand give a quite accurate picture of the entire line. This is because the actual escapement in the recorder will be by full unit jumps which may or may not fit the instant character and also may at times be the result of an accumulation of three "one-third" impulses as totalized by the flip-flop relay system.

It is also to be borne in mind that the actual pulsing of either one-third or two-thirds units from the code selector, does not change the state of the flip-flop system until after the pulse has been removed, that is, until the actuated selector slide returns to its original position. This is accomplished by the "set" and "re-set" operations of the elements of the flip-flop system.

Broadly considered, the flip-flop installation FF comprises a one-third unit FFA and a two-thirds unit FFB respectively responsive initially to one-third pulses from the line O and two-thirds pulses from the line T. Each of the assemblies is further sub-divided into X and Y components. Thus there will be four relays altogether which may be designated ⅓X, ⅓Y, ⅔X, and ⅔Y.

Now resuming the tracing of the impulse from the lower case primary font $q$ along the line 77 through diode $d2$, it will be noted that the contacts $w4$ and $w5$ are normally closed and the pulse will carry along the wire 85 directly to the one unit escapement magnet LE1 and under these circumstances, since we are assuming that the Q character is the initial character in a line, the escapement will be poised for actuation to the extent of one unit through this portion of the circuitry.

Now, since the pulse from lines 75 and 78 is for a one-third unit the circuit follows through line O through the normally closed switch contacts 7R and 8R of the "one-third" flip-flop assembly FFA and then passes to the contacts 7R and 8R of the "two-thirds" assembly FFB (which are normally closed since we are assuming that the "two-thirds" flip-flop FFB is not as yet energized). The connection then follows back to the junction 86 with the "set one-third" lead 87.

Digressing for the moment, it is important to note that each of the X and Y flip-flop relays is wound with two coils, the coils being wound in opposite directions, the specifications of this type of relay being such that when either one and only one of the coils is energized, the relay picks up and when both coils are energized the relay drops out. It should be noted further that all contacts controlling external circuitry, that is, circuitry not concerned with the internal operation of the relays themselves, are on the Y relays.

Now assuming that the "set one-third" lead 87 is energized, we are applying minus current through diode AD20 to the right-hand coil of the ⅓Y relay, and minus current is applied through diodes AD19, AD18 to the left-hand coil of the ⅓Y relay. Hence the Y relay does not actuate. Also, we have minus current applied through diode AD19 and through diode AD17 to the right-hand coil of the ⅓X relay, but it is stopped from the left-hand coil by blocking diodes AD15 and AD16. Hence the ⅓X relay does pick up on the application of the "set one-third" pulse. (Other diodes AD21–AD25 occur in the circuitry according to required current flow, but only those directly involved in the specific example recited will be described.)

Now at the time that the pulse is removed from the "set one-third" lead, there is a circuit through operated contacts 2R and 3R of the ⅓X relay, applying minus current (from line W) to the left-hand coil of the ⅓Y relay. That is now the only minus current leading to the ⅓Y relay. Therefore, relay ⅓Y is actuated.

There is a holding circuit on the ⅓X relay through contacts 2L and 3L to the resister R and diode AD17 to the right-hand coil of the ⅓X relay and hence the ⅓X relay remains energized. Now at the end of the full cycle, the flip-flop FFA is in a state in which both the ⅓X and ⅓Y relays are energized. This completes the "set" cycle for the ⅓ flip-flop FFA.

The pulsing of the "set" cycle may be considered as being accomplished in two steps: first, the application of the pulse, and second, the removal of the pulse.

All contacts subject to the ⅓Y relay at the end of the pulse are transferred and all contacts on the ⅓X relay at the end of that pulse are transferred. The ⅓Y relay contacts of course comprise the switches o2–o17, but these transfers of contacts did not occur at the moment of applying the pulse but after the pulse was applied. The sequence of operations is suggested in the timing chart comprising FIGURE 22B₁ of the drawings where the relative timing of the set impulse and re-set impulse is indicated with reference to the energizing of the ⅓X and ⅓Y relay elements. Thus, upon application of the set pulse, the ⅓X relay coil picks up but the Y coil does not pick up. However, when the "set" pulse is completed the X coil still remains energized, but the Y coil does pick up and remains so until otherwise instructed by the receipt of an impulse by the following character.

Thus far, as a result of the operation of the lower case primary font q circuitry, we have a full unit escapement as a result of the set-up in the LE1 magnet energized and the "one-third" flip flop FFA actuated, thus pulling movable contacts of the switches of the series o2–o18 down. Also, the ⅓Y relay has moved its 8R switch blade down to make contact at 9R and the 11R switch blade to make contact at 12R, beneath the ⅓Y relay. Thus the ⅓FFA flip flop has stored up a one-third unit escapement value.

Now for an example, let us assume that either the character key for another q is depressed (or another character which will correspond to a width ending in the fraction one-third), the impulse will again pass along the wire 75, the extension 77 and through the contacts w4 and w5 and the line 85 to energize the one unit escapement magnet LE1. The impulse follows this same route due to the fact that the two-thirds FFB flip-flop has not been energized and the contacts w4 and w5 are still closed.

However, upon following down the lines 78 and O, we find that contacts 8R and 9R of the ⅓Y relay are closed thus carrying the current down through the wire 89 through the diode AD12 to the "set two-thirds" conduit 90. At the same time the current passes from contact 9R of the "one-third" relay through diode AD13 and up through the re-set one-third conduit 91. Up to this point, it will be recalled that the ⅓X and the ⅓Y coils are energized and all contacts are transferred on the ⅓X relay. Contacts 2R and 3R are closed; contacts 4R and 5R are open, and the ⅓X coil contacts 2L and 3L are closed. Now the pulse passing through the re-set one-third line 91 goes through diode AD14 to the left-hand ⅓X coil and also through diode AD15 and the resister R through diode AD17 through the right-hand coil thus energizing both coils, and the relay drops out. It is to be noted that the resister R is used as a dropping resister to prevent over-saturation of the coil, and thus making it easier to apply flux in the opposite direction and then dropping out the resister, thus dropping out the X relay coil faster.

At this point, both the left-hand and right-hand coils of the ⅓X relay are energized and the X relay has dropped out. Now when the X relay does drop out, after its point of release, full voltage is applied to both coils and that full voltage is also applied through diode AD16, through normally closed switches 4R and 5R through AD17 to the right-hand coil. Also, voltage is kept on the left-hand ⅓Y coil through diode AD16, switches 4R and 5R and the diode AD18. At this point as the pulse is applied the ⅓X relay is now out and the ⅓Y relay is still energized.

At the same time, the pulse has also passed from the contact 9R of the ⅓Y relay through the diode AD12 and up the set ⅔ conduit 90 and into the ⅔Y relay by way of the diodes AD11, AD10, and AD9. Both the right-hand and left-hand coils being energized, the ⅔Y relay is not actuated. However, we have minus current passing through diode AD6 into the right-hand coil of the ⅔X relay. This, as in the case of the description of the FFA flip-flop causes the ⅔X relay to actuate transferring the switches indicated just above the ⅔X relay and given similar designations to the corresponding switches of the FFA circuit, namely, 3R and 2R, 4R and 5R, and 2L and 3L.

At this point, we have the ⅔X relay energized as a result of the "set two-thirds" signal and upon the release of the pulse the same activities take place as described in connection with the one-third flip-flop FFA, namely, the ⅔X relay (through the energizing of the left-hand coil from the negative lead W) and the left-hand coil of the ⅔Y relay, are energized. This left-hand coil is at that time the only coil of the ⅔Y relay carrying current, and thus the switch arms w2–w17 are transferred, thus storing two-thirds of a unit in the system over and above the full unit actuation of the LE1 magnet.

Now, again (for the third time) let us assume that still another character having a width of one and one-third units is called for. The pulse moves along the line 77 to the switch blade w5 which has been transferred and thus the pulse moves through contacts w6 and along line 93 to the LE2 escapement magnet, there now having been accumulated three one-third units which of course total a full extra unit to be added into the recorder escapement.

Following down the one-third unit buses 78 and O and through the now closed contacts 7R and 8R of the ⅓Y relay and through the actuated contacts 8R, 9R of the ⅔Y relay, the pulse follows the line 91 which is the "re-set" two-thirds circuit. The state of the circuitry is now that both flip-flop devices FFA and FFB are in their normal de-energized position. The first one and one-third width character has escaped the carriage one unit, the second one and one-third unit width character has escaped the carriage one unit, and the third one and one-third width character has escaped the carriage two units.

Of course, if a key is punched calling for a character of a width ending in two-thirds of a unit, such as the four and two-thirds upper case secondary font Q, the impulse follows the wire 82 through the diode e5, switch arm o14 and through contact o13 if no one-third unit is in storage. Then it follows the conduit 94 and goes through the contacts w14 and w13 if there is no two-thirds unit value in storage. Then it passes through conduits 95 and 96, the former leading to the conductor 97 to the LE3 escapement magnet and the latter leading to the conduit 85 connected to the LE1 magnet, thus totalling four full units of escapement.

The lower lead 83 from the junction point of the line 80 passes through the diode t5 and the conduit T; through the normally closed contacts 11R and 10R at both the ⅔Y and ⅓Y relay linkages. Thence through the wire 90 which is the "set ⅔" lead, thus starting the now familiar "set" procedure for the two-thirds flip-flop FFB.

It should now be understood how added pulses for character widths ending in either one-third or two-thirds units would add up through the storage and totalizing functioning of the flip-flop units, to give actual full unit escapements in the recorder and to feed additional full unit escapements as the fractional units add up to integers.

In order to have a constant visual indication of the presence or absence of an excess ⅓ unit or ⅔ unit, signal lamps ⅓L and ⅔L are provided on the machine adjacent the keyboard. These lamps are respectively energized by means of the switches ⅓m and ⅔m the operators LA and LB.

Now the above description has been developed with particular reference to the action of the recorder or keyboard machine, but it should be mentioned at this point that up to and including this stage of operation the circuitry is equally applicable to the functioning of the reproducer or photo-unit as will presently be described.

Continuing, however, with reference to the recorder machine, attention is now directed to the prolongation of the circuitry from the bottom of FIGURE 22B to FIGURE 22C. The connecting links between these two areas of circuitry are of course the relay rods or operating armatures or linkages LA and LB from the one-third flip-flop FFA and the two-thirds flip-flop FFB.

As already indicated, a purpose, in the recorder machine, is to detect any fractional overage at the end of a line, which is to be subtracted from the first word space on transcription by the reproducer. Also already referred to, is the line end coding of the basic machine, namely, the interlock code "7," the justification code "76" including the choice of five word space and step-down codes, and finally the carriage return code "356."

All of this involves the actuation of the appropriate punch magnets in setting up these codes in the tape. In this connection, reference is again made to FIGURES 24 and 25 herein.

Now when the operator decides to end the line, he depresses the J-carriage return switch, for the first punching of the "7" code which was previously called the interlock code, but now includes any existing overage of fractional escapement units which might be left at the end of the punching of the line of characters. If there is an overage of one-third of a unit the "1" code is employed to signify this, thus a "71" code will be punched; and if the overage amounts to two-thirds of a unit, it is signalled by a "5" code, thus a "75" code will be punched.

FIGURE 22C ties up this fractional coding modification with the circuitry of the Blodgett patent as shown in FIGURES 70 and 70A of that patent. The circuitry in FIGURE 22C to the "7" code punch magnet LP7 (of the group LP1–LP7) is through the conduit 100 and diode W7 to the left-hand fixed contact of the HCT counting switch, the return connection being from LP7 through the conduit 101.

Now since the "1" and "5" punch magnets LP1 and LP5 are involved they are shown in FIGURE 22C as being associated with the return conduit 101 and having respective lead conduits 102 and 103 which terminate in contacts 15AL and 15BL respectively. The lead 105 from the Blodgett counting circuit is through the diode W3 to the movable switch arms 14AL and 14BL associated with the fixed contacts 15AL and 15BL, these contacts being respectively closed by the positive actuation of the one-third flip-flop FFA and the two-thirds flip-flop FFB through the downward movement of the rods or linkages LA and LB respectively as depicted in FIGURE 22C.

It will be seen that the switches 14AL–15AL and 14BL–15BL are intermittently actuated all during the punching of a line, depending on the required actuation of the ⅓Y and the ⅔Y relays of the systems FFA and FFB; but for signalling the modified justification coding for the reproducer we are only interested in the fractional units left over at the end of the line and this depends upon the position of the switches 14AL–15AL and 14BL–15BL when the J-carriage return switch is closed. Thus, if at this moment the 14AL–15AL switch is found to be closed through the eventuality that there is a one-third unit left over, the LP1 punch magnet is energized along with the usual LP7 punch magnet. On the other hand, if there was a surplusage of two-thirds of a unit, the FFB flip-flop through the linkage LB will have closed switch 14BL–15BL and thus in condition to energize the LP5 punch.

Since the flip-flops FFA and FFB can never be energized at the same moment, there are only three situations possible, namely, a bare "7" code when both flip-flops are de-energized and there is no surplusage of fractions; a surplusage of one-third of a unit due to the closing of the switch 14AL–15AL resulting in a "71" code; or a surplusage of two-thirds of a unit when switch 14BL–15BL is closed, resulting in a "75" code.

Tying in the operation to some further extent with the Blodgett 2,700,447 circuitry as shown in his FIGURES 70 and 70a, when the J-carriage return switch is actuated it picks up the ICR relay and the impulses are carried through the Blodgett counting system and circuitry without any deviation from his described operation. Thus, feed holes are punched up to the thirty count and when this is reached the HCB contact and the hole count magnet HCM transfers. The next pulse will be a minus pulse through the diode W7 thus picking up the punch magnet LP7, and at the same time through the diode W3 the state of the flip-flop switches are sampled and pulses transmitted to the respective magnets LP1 or LP5 according to the condition of the flip-flop actuated switches.

After the completion of this portion of the line-end code punching, the circuit of the Blodgett system takes over and punches the "76" and justification code and the carriage return code. Upon completion of the J-carriage return cycle, the actual carriage return operates and the carriage return tab contacts serve to break the holding circuit to the flip-flop system thus dropping out any storage in the flip-flops so that the new line will start off in the "zero" state. These carriage return contacts are designated in FIGURE 70a of the Blodgett patent and in FIGURE 22B of the present application as CRC.

This concludes the description of the operation of the recorder machine and it will be understood that at this point there has been produced a typewritten proof copy which, although each character has not been allotted its exact fractional width, yet the total appearance of the line is quite accurate, not being off by more than one-third or two-thirds of a unit; and furthermore, a tape has been punched for use in operating the reproducer machine which will absorb the fractional overage of units at the end of a line by subtracting it from the first word space during the justification process. Of course, the actual provision of fractional words space allotments for each character of a given font is accomplished in the reproducer unit through its own code selector installation 13 (FIGURES 7–10), and in the case of the reproducer the actual spacing of the characters according to the fractional or incremental system will be accomplished by the supplemental operation of the carriage escapement through the carriage rack escapement solenoids already described and illustrated in FIGURES 15 to 21 of the drawings.

The circuitry involved in the actual modified escapement of the reproducer machine, in addition to the common circuitry shown in FIGURES 22A and 22B will, now be described in connection with FIGURE 22D which is referable to the lower end of FIGURE 22B by the placement of the flip-flop actuating rods or linkages LA and LB, just as in the case of the recorder circuitry of FIGURE 22C.

For convenience of reference, the reproducer circuitry of FIGURE 22D is applied to the Sausele phototypesetter machine circuitry as set forth in FIGURE 40A of the Sausele Patent 3,082,670. Thus, in the upper lefthand corner of FIGURE 22D is to be found the cyclic control shaft 160 of the Sausele arrangement with its escapement controlling cam member III having the inset cam portion IIIA and the protruding cam portion IIIB, this arrangement sequentially serving to actuate the middle switch arm IIIc between the fixed contacts IIIa and IIIb. As described in the Sausele patent, when minus current is supplied to the escapement release solenoid 455, minus current is supplied through the line 110 through diode AD7 to the movable switch arms 14L respectively under the control of the linkages LA and LB of the flip-flop systems FFA and FFB. The upper and lower fixed contacts of these two sets of switches are designated respectively 13L and 15L.

Now, of course, the basic full unit escapement for a given character has already been stored in the array of LE1, LE2 or LE3 magnets, and that value of escapement is fed into the rack 138 of the primary carriage 425 through the pinion 136 carried upon the escapement shaft 133, all by the actuation of the escapement release magnet or solenoid 45, at the appropriate time.

Now, however, there must be taken into consideration any fractional units or increments associated with the particular character under consideration, and for this purpose the condition of the flip-flop assemblies FFA and FFB must be sampled. At this time the master character disc, shown at D in FIGURE 2 and in the Sausele patent, is released and is being indexed to the next character that is going to be transmitted. With the escapement magnets energized and the flip-flops in a particular state of being, when the disc reaches its next stopping point, regardless of how long it takes, a circuit is completed to the RG relay. (See the Sausele patent FIGURE 40A.) The shutter control shaft 160 begins to rotate, the character is projected to the film, and following the projection of the character by means of the shutter operation, the set of contacts on the escapement cam III are closed and the full unit escapement information stored in the escapement magnet group is derived and applied to the primary carriage by magnet 455.

At the same time, a pulse is directed along the conduit 110 through the diode AD7 to sample the state of the switches 13L, 14L, 15L under the control of both the one-third flip-flop FFA and the two-thirds flip-flop FFB. Now if the ⅓Y relay is in, the linkage LA is in its down position in FIGURE 22D and contact is made between 14L and 15L of the ⅓FFA. This picks up the ⅓SCR relay and through the actuation of its armature linkage LS in the downward direction, the switch blade 4R of the ⅓ unit system is moved to close a circuit with the contact 5R thus furnishing a minus pulse from the line 112 to the fractional escapement solenoid 512, and thus shifting the rack 475 to add one-third of a unit (or one additional increment) to the escapement for the character under consideration.

A holding circuit for this operation is designated 117 which eventually connects with the line 120 leading to the CRC set of contacts comprising a source of minus current. Thus the actuation of the ⅓SCR through mechanical connection LS closes contacts 4L–5L associated therewith and the holding circuit is completed through the contacts 1R and 2R of the ⅔SCR system and through the contacts 1L and 2L of the NSR set-up.

Now if and when the ⅔ flip-flop system FFB is the one to be energized, its switch blade 14L is brought into contact with its fixed contact 15L, the ⅔SCR relay is actuated, and through the mechanical connection LT its fractional solenoid switch 4R–5R is closed. Through the line 114 the second fractional rack-operating solenoid 515 is energized, and at the same time through the line 115 including diode AD$x$ the solenoid 512 is also actuated, thus bringing the rack shifting linkages to the conditions illustrated in FIGURE 21 of the drawings.

The holding circuit for this shift is through the lines 118 and includes the normally closed switch 1R–2R of the ⅓SCR installation, and this circuit is set up by the actuation of the 4L–5L switch of the ⅔SCR relay group.

Now if the character is such as to have a width value so as to reset any fractional unit set-up, neither of the flip-flop systems FFA or FFB will remain in an energized condition. Therefore, both sets of contacts 13L, 14L of the two systems are closed and the circuit is made through the line 116 to the NSR or "no solenoid" relay. Actuation of this relay through connection LU breaks the contacts 1L–2L of the NSR system which terminates any holding circuit in the ⅓SCR or ⅔SCR systems, and at the same time closes contacts 4L, 5L shown above the NSR relay, which establishes a holding circuit 119 through the normally closed contacts 1L and 2L of the ⅔SCR and ⅓SCR relays. Thus, the 4R and 5R contacts of the two supplemental fractional rack-shifting magnets 512 and 515 are effectively broken and only the integer or full unit escapement takes place. Upon any subsequent actuation of the ⅓SCR or ⅔SCR the holding circuit 119 for the NSR relay is of course broken.

The reception and handling by the reproducer machine of the information in the tape with respect to the fractional end-of-the-line carryover, will now be described in connection with FIGURE 23 of the drawing and with the description of the analogous operation of the Blodgett machine in mind, particularly as found in columns 48 and 49 of Patent 2,700,447.

The first code read by the J-reader 16J is the "7" code (not the "76+" code) together with any existing "1" or "5" code indicating fractional unit carryover. The J-reader then places in "storage" one or the other of the latter codes depending upon whether an excess one-third unit or an excess two-thirds unit is found. This is accomplished by means of another flip-flop installation which will be described.

If this is the first line of a piece of composition, the print reader is idle, and the J-reader 16J then reads the next code which is the "76+" or justification code, whereupon it samples the state of the J-flip-flops and picks up information from the one-third J-flip-flop, the two thirds J-flip-flop, or neither, depending on the fractional unit carryover situation.

At the same time, through the old Blodgett circuitry, the J-reader selects from the standard starting word space coding ("1, 2") and step-down coding ("3, 4, 5") according to the measure of the starting word space and the point at which the word space widths start to diminish. (See the charts of FIGURES 24 and 25.)

Also at this stage, the J-reader pulses the print-reader and when the print-reader reads the "76+" coding it will reset the J-flip-flops, thus leaving them in the "zero" state ready to receive instructions for the next line.

Now if we assume that the line of type under consideration is not the first line of the composition but a subsequent line, and we find the print-reader reading and transcribing a line, then upon the J-reader arriving at the first "7" code it stops itself and awaits the arrival of the print-reader at its "7" code, whereupon the print-reader pulses the J-reader and starts it up again. This situation should be noted as giving rise to a reason for the establishment of the flip-flop relays in the J-reading circuit instead of merely feeding the fractional unit carryover information directly into storage relays, as in the case of the regular justification data, all of which will be explained in connection with the detailed operation now to be described.

The general circuitry of FIGURE 23 will be described. It is to be noted here as in other illustrations of circuitry, that elements analogous to those used in specific examples are appropriately designated in the drawings but not necessarily mentioned in this description. Escapement unit values are used to identify elements or circuitry pertinent to corresponding escapement operations. A partial set-up of the print-reader contacts (PRC6, PRC7) analogous to the circuitry of FIGURE 71b of the Blodgett Patent 2,700,447 and described in columns 48 et seq. of that patent, is shown in the upper left-hand corner of FIGURE 23. In the upper right-hand corner is a partial representation of the justification reader 16J contacts including JRC1, JRC2, JRC5, JRC6 and JRC7. (In this particular instance, there is an additional contact provided for JRC1 for use in the fractional unit coding.) Flip-flop relays similar to those shown at FFA and FFB are indicated diagrammatically at ⅓JCFF and ⅔JCFF respectively. The usual step-down relay is indicated at SDR; the regular first word space storage relays at JR1 and JR2; and the newly installed fractional unit storage relays at JR⅓ and JR⅔.

The word space contacts already mentioned are indicated at WSC, and the associated word space relay at WSR which leads into the familiar Blodgett circuit. The half-step relay of the Blodgett circuit is indicated at CRP in broken lines, and an auxiliary half-step relay is indicated at AUX CRP connected in exact parallelism with the relay CRP. The print-reader control relay at PRR also operates in exactly the same fashion as described in the Blodgett patent and functions in a holding circuit for the fractional unit storage relays.

At MJ is shown a tree circuitry by which the several factors determining the modified width of all word spaces are accumulated and the resultant transmitted to control the mechanical escapement of the carriage of the reproducer, the appropriate conductors leading out of FIGURE 23 through trunks 175, 176, and 177 to connect with the leads at the upper right-hand portion of FIGURE 22A, at points beyond the plug-board, in the example described being points b3–b15 inclusive.

Now for a specific example of the operation of this first word space modifying system, let it be assumed that the normal first word space is of five units of escapement; in other words, both the storage relays JR1 and JR2 are energized (through the lines 146 and 145 from switch banks JRC₁ and JRC₂ respectively) (see FIGURE 24). Also, let it be assumed that the overage or carryover inscribed in the "7" coding of the tape is two-thirds of a unit (signified by the code "5").

Thus, the first reading of the modified interlock code by the J-reader 16J will be "75" from the line 140 bringing in minus current through the operated JRC7 switch by the movement of the switch arm 7a to the left to close with the contact 7b. This leads to the normally closed right-hand contacts 6a, 6b of JRC6 and along the line 141 which feeds to both JRC1 and JRC5. Since the switch JRC5 is operated, movable contact 5a will close the fixed contact 5b and thus the line 142 will be live to the "set" side of the ⅔JCFF flip-flop unit. This will result (in accordance with the description of the similar flip-flop installation) in FIGURE 22B of the drawings in actuation of the Y side of the flip-flop and will close the switch 1L, 2L directly beneath the ⅔JCFF flip-flop. This eastablishes the first fractional unit storage or memory.

Next, the J-reader encounters the justification code "7612+" (bearing in mind that the starting word space width is five units calling for the signal "1, 2" (see FIGURE 24) and also, by circuitry fully described in the Blodgett patent, reading the step-down information from the coding selected from the codes "3," "4," and "5"). Therefore, the operated contacts 7a, 7b are closed and the contacts 6a, 6c are operated within the JRC6 switch assembly which supplies current to the line 144, and since the JRC2 contacts 2a, 2b are closed the JR2 storage relay is energized and similarly, the contacts 1a and 1b of the JRC1 set of contacts are closed and current is supplied to the JR1 storage relay through the line 146. Also, the reading of the "76" code in the J-reader pulses the print reader to begin print reader operation.

At the same time, the line 144 continues to the switch 1L, 2L of the ⅓JCFF and to the 1L, 2L switch of the ⅔JCFF. At this point, the ⅔JCFF is found in "set" condition and its contacts 1L, 2L are closed, but the contacts 1L, 2L of the ⅓JCFF are open. Thus, the JR⅔ storage relay is energized.

Now the J-reader must not be permitted to read a new "7+" code and attempt to "pile up" new fractional information upon the data already received and thereby lose the new signals; and thus when the print-reader reads its first code "76," contacts P7a, P7b will close and connect through the line 147 with the contact P6a which will have closed upon the contact P6b to furnish minus current to the line 148 which connects to the reset sides of the JC-flip-flops. Thus, the previously set flip-flop ⅔JCFF will be reset and its contacts 1L and 2L will open. However, through a holding circuit employing the minus current line 168 operating through holding switches 169 and 170 for the fractional storage relays JR two-thirds and JR one-third respectively, the secondary memory or storage units JR⅔ and JR⅓ continue to hold the information even though the ⅔JCFF and ⅓JCFF flip-flop relays have been restored to zero in readiness to receive new settings from the J-reader.

Thus, the information regarding the necessary curtailment of the width of the first word space is held in readiness for the arrival of the print-reader at the first word space during its reading of the line in question. When this occurs, the word space contacts WSC are closed and the usual circuit through the word space relay WSR is set up and proceeds as described in the Blodgett circuitry. Also, the ordinary procedure takes place in the circuitry involving the print-reader control relay PRR (energized during print reader operation), and the half-step relay CRP. Note that as in Blodgett's circuitry, the CRP relay picks up when the WSC contacts open after the first word space. Since the Aux. CRP is in strict parallelism with the relay CRP it actuates simultaneously, and at the proper time breaks the holding circuit for the fractional storage relays JR⅔ and JR⅓ through the line 168.

However, before this is effected, the information stored in the relays JR1, JR2, JR⅔, and of course the step-down relay SDR, is fed into the tree circuitry MJ. In this circuitry, the mechanical operator connections from storage relay JR2 is designated LR2 and serves to actuate the movable contact 2L directly thereunder between the fixed contacts 1L and 3L of the JR2 system. The storage relay JR1 operates through the rod or link LR1 to actuate the movable switch arms 2L and 5L respectively between the fixed contacts 1L, 3L and 4L, 6L.

Then the fractional storage relay JR⅓ is designed to operate through the mechanical connection LR⅓ to move the switch arms 5L, 8L, 2R and 5R between the pairs of fixed contacts 6L–4L, 9L–7L, 3R–1R and 6R–4R.

It is to be noted at this point that the leads from the upper ones of these contacts, namely, 6L, 9L, 3R and 6R signal respectively reduced first word space widths of 1⅔ units, 2⅔ units, 3⅔ units, and 4⅔ units, these leads being collected in the conductor cable 175.

The lower fixed contacts of each of the above-mentioned switches connect with movable switch arms 5L, 8L, 2R and 5R which are adapted to be moved through the linkage LR⅔ operated by the storage relay JR⅔. Here again the movable contacts operate respectively between the following pairs of fixed contacts 6L–4L, 9L–7L, 3R–1R, and 6R–4R. Again, the upper fixed contacts 6L, 9L, 3R and 6R have leads which join in the cable 176 and transmit impulses for the setting of the reduced first word space width of 1⅓ units, 2⅓ units, 3⅓ units, and 4½ units, respectively.

Again, the lower fixed contacts under the control of the relay JR⅔, namely, 4L, 7L, 1R and 4R lead to the movable contacts 5L, 8L, 2R and 5R actuated by the step-down relay SDR through the linkage LD.

The movable SDR contacts 5L, 8L, 2R and 5R operate between the pairs of fixed contacts 6L–4L, 9L–7L, 3R–1R, and 6R–4R. Now here the upper contact 6L of the uppermost set of switches connects with a lead to the cable 177 in calling for one unit of escapement for the first word space. Both the lower fixed contact 4L of the first switch and the upper fixed contact 9L of the second switch connect with the lead joining the cable 177 which calls for two units of escapement. Similarly, the lower fixed contact 7L and the upper fixed contact 3R join a lead calling for three units and the lower fixed contact 1R and upper fixed contact 7R call for four units. Finally, the lowermost fixed contact 4R has a lead joining the cable 177 and calling for five units or first word space escapement.

Now carrying through the example suggested above which, it will be recalled, requires a normal five unit first word space in the justification distribution signified by the "1, 2" code of the justification coding "76+," and there was carried over two-thirds of a unit from the punching of the line, as signified by the "5" code accompanying the interlock coding "7+," we proceed from the closing of the switch contacts ws1 and ws2 of the WSC switches. Minus current is thus supplied to the line 172 to the movable contact 2L under the JR2 relay. This relay has been actuated as indicated by the dotted line representation of the contact 2L so contact is made wih the lower fixed contact 3L. From here the line 179 leads to the movable contact 5L under the JR1 relay and since this relay has also been in actuated position the current follows the dotted line position of the contact 5L into contact with the lower fixed contact 6L and along the line 180.

Now the one-third storage relay JR⅓ has not been actuated. Therefore, the normally closed contacts 4R–5R of the JR⅓ relay remain closed and current flows through the line 181 to the movable contact 5R actuated by the two-thirds storage relay JR⅔. This relay, it will be recalled, is in an actuated state and therefore the switch blade 5R is in the dotted line position making contact with the fixed contact 6R and carrying the current into the cable 176 and thus up to the contact b13 to four and one-third unit line 185 at a point somewhere between the output of the plug-board PB in FIGURE 22A and the input to the maze at the upper left-hand portion of FIGURE 22B.

The state of the fractional unit storage relays FFA and FFB at the time of word space output, denotes the path of the minus current from line 185. For all practical purposes, the word space may be considered as a 4⅓ unit value character subjected to exactly the same circuit explanation as previously described in detail.

If for example, the flip-flops FFA and FFB were de-energized, from line 185 minus current passes through the diode d5 along the line 94 and to the lines 95 and 96 to both of the escapement magnets LE1 and LE3, thus totalling four units of escapement for the actuation of the primary carriage; and in the meantime current from the line 185 passed downwardly along the line 186 through the diode s5, the line O, and on to set up the ⅓ flip-flop system FFA for actuation through the linkage LA into the system set forth in FIGURE 22D to energize the solenoid 512 and thus apply the additional one-third of a unit to the total escapement for the first word space.

In retrospect, it will thus be seen that although the normal escapement for the first word space was five units, the carryover of an excess two-thirds of a unit has served to reduce the first word space width from five units to four and one-third units.

With other settings of first word space width relays JR1 and JR2, and of the incremental storage relays JR⅔ and JR⅓, the calculation can readily be carried through the MJ circuitry in a manner similar to that set forth above.

Now if the fractional count after the line is punched should result in no excess fractional units the interlock signal will be merely "7" and neither of the relays JR⅔ or JR⅓ will be energized. Thus, the original first word space width called for by the selective actuation of the relays JR1 and JR2 will carry through the circuitry MJ all the way to the series of switches actuated by the step-down relay SDR and thus the output of this last series into the cable 177 will be in terms of even units from one to five.

Line 190, in communication with the source of minus (−) current, constitutes a holding circuit upon the closing of the switches, HDR, HJR1, and HJR2, which holding circuit is broken after the eight word space. In this connection see column 51, lines 75 et seq. of the Blodgett Patent No. 2,700,447. It is also to be noted that the SDR relay cannot pick up until after the first word space.

Thus far, the invention has been described in connection with a photo-typesetting unit such as disclosed in the above-mentioned Sausele patent. The principles of the invention may also be applied to other means of implanting the supplemental fractional escapement to carriages of either proportional spacing typewriters or photo-typesetting units.

For example, in FIGURES 26 and 27 there is disclosed an adaptation of the invention which contemplates the application of the fractional supplemental escapement to the same basic carriage rack to which the principal escapement is being applied, namely, through the pinion 136′ carried upon the escapement shaft 133′ under the control of the basic escapement system which includes the ratchet wheel 132′.

The basic carriage rack is indicated at 138′ and it will be noted that the teeth of the rack 138′ and of the pinion 136′ are both inclined.

The escapement pinion 136′ in this embodiment is splined to the escapement shaft 133′ as suggested at 133A and is provided with a grooved hub 136A.

A lever arm 192 is pivoted as at 193 to a fixed portion of the frame 50 of the machine and is provided with a roller 194 at its upper end. It is slotted as at 199 for the reception of a pin 200 carried upon the end of the horizontal bar 501A, which is the counterpart of the stub connection 501 to which the movable rack 475 is secured in the principal embodiment already described. The left-hand end of the rod 501A is rigid with the shaft 505 which is actuated by the solenoids 512 and 515 within the casing 502 in exactly the same manner as described in connection with the earlier embodiment of the invention.

In operation, the movement of the rod 501A will shift the pinion assembly 136A, 136' along the shaft 133' and due to the wedging engagement of the inclined teeth of the pinion 136' and the rack 138' the rack will be given a fractional-unit further escapement movement added to that afforded by the escapement rotation of the shaft 133'. This total escapement will thus be applied to the carriage 425' which may of course be the ultimate carriage carrying the medium upon which the composition is to be impressed.

In FIGURES 28 and 29 of the drawings, there is shown a deviation from the arrangement disclosed in connection with the principal embodiment and in which the supplemental fractional shifting of the rack 475 would be applied rather directly through a bodily movement of the gear assembly 479. In this embodiment, the proportionating gearing 479 is deprived of its function by the stripping of the gear teeth from the gear member 480A and by pinning the gear assembly to the frame 477 by which it is secured to the housing 210 of the film carriage F. This pin or bar is indicated at 203 in the drawings.

The operation of this embodiment will be readily perceived. At the same time that the principal or basic carriage 425 is moved by the regular escapement 133–138, the supplemental escapement solenoids 512 and/or 515 will move the rack 475 as in the other case, but instead of rotating the gear assembly 479 it will merely move this assembly along the frame and thus shift the carriage through bodily movement of the gear, the smooth toothless periphery of the gear element 480A merely sliding along the teeth of the idle upper rack 483.

The invention, in its application to any proportional spacing typewriter, or in fact to a non-justifying photo-typesetter or like machine, contemplates a system such as would be involved, for example by the combination of circuitry represented by FIGURE 22A (but capable of being actuated in this case directly from the keyboard of the typewriter); by FIGURE 22B, wherein the whole unit values of escapement are transmitted to the primary escapement means $LE_1$, $LE_2$, and $LE_3$, the fractional units (or increments) are accumulated and eventually applied as whole numbers to the primary escapement; and by FIGURE 22D wherein the fractional escapement values are applied to the supplemental escapement means represented by the solenoids 512 and 515. All that is needed in a relatively simple proportional spacing typewriter is a character key actuated switch which would be the equivalent of a switch IIIb which would be used in a non-justifying photo-typesetter. Such a switch is suggested in broken lines at KA in the circuitry of FIGURE 22D.

The typewriter would be provided with a unit scale US (as in FIGURE 1) for indicating to the operator the count of units used up in the direction of measure of the line, supplemented of course by the signal lamps ⅓L and ⅔L which serve to indicate the accumulated fractional value in storage at any given time.

Thus, in the operation of such a typewriter or other non-justifying type composition producing machine, a character key it struck and the impression is made. Meanwhile the movement of the code selector slide corresponding to the character selected, in the contact making direction, has taken place. This initiates the activation of the circuitry just as in the case of the receipt of coded tape or other signals through a reader device in a reproducer machine as previously described, the full unit escapement pulses going to selected ones of the magnets $LE_1$, $LE_2$, and $LE_3$, and the appropriate fraction going to the flip-flop maze. Substantially at the time the type bar strikes the paper to make the typewritten printing impression both the primary escapement system LE-133 and the supplemental fractional escapement system 512-515-501 are actuated to escape the carriage the required integer and fractional distance for the character just typed.

Of course the fractional solenoids 512 or 515 keep the fractional escapement mechanism of the carriage (for example 475 or 136') moved only so long as any of the holding circuits 117, 118 or 119 are energized; but the receipt of another fractional pulse in this incremental system serves to selectively break such previously actuated holding circuits, and the next movement of the escapement means takes cognizance of the accumulated fractional values and adds to the fractional escapement movement accordingly. The totalling of fractions which would amount exactly to an integer unit, of course, would call for adding a one-unit value to the actuation of the primary escapement device through magnets $LE_1$, $LE_2$, or $LE_3$, and the release of any actuated fractional solenoids.

Another important feature in connection with the application of the invention to any of the machines described—whether the justifying reproducer or typesetter, the recorder for such a machine, or a simpler proportional spacing typewriter—is the necessity for restoring the fractional escapement mechanism to zero, or to drop out stored fractional values, upon tab operations or carriage return. This is, of course, accomplished by the CRC contacts shown in FIGURES 22B and 22C; these contacts being identical with those designated CRTC in the Blodgett patents and functioning, as fully described therein, to initiate all of the movements associated with retraction of the carriage.

If, however, the total of the stored fractional units and the newly called for fractional units, exceeds a whole or integer unit value, one or both of the fractional escapement solenoids will remain in energized state, along with the energizing of the integer escapement magnets $LE_1$, $LE_2$, or $LE_3$.

It is understood that the specific examples disclosed herein are for illustrative and exemplary purposes only, and various changes and alterations may be made therein without departing from the scope of the invention as defined in the subjoined claims. Also, in the claims, the designations of the elements and combinations recited are to be interpreted in a generic sense, where not more specifically set forth or limited by prior art: for example, a "translater" can be any device for converting received codes to individual character or function representing elements such as typewriter keys or selector slides; and a "code selector" may be any instrumentality for converting characters or functions to codes to be impressed on the tape or other transfer medium, or for allocating to such characters or functions certain appropriate measures of escapement. Also, the term "tape" when used broadly is intended to cover any intelligence receiving and transferring element adapted to be coded in the recorder and read in the reproducer.

Having thus described the invention, what is claimed as new and desired to be secured by Letters Patent is:

1. A system for setting variable character width text composition which comprises, in combination, a recorder machine for producing a coded member carrying codes for character selection and spacing, and a reproducer machine for operation by said coded member to produce text composition according to the character selection and spacing called for by said coded member; a carriage in said reproducer machine for supporting a medium for the reception of such composition and moving said medium in successive steps past a relatively fixed point of imprinting of the characters, and basic escapement mechanism for moving said carriage in steps comprising one or more predetermined equal integer units of predetermined width, the number of such basic integer units variable roughly in accordance with the prescribed spacing and the character width in a given font; code selector means in said reproducer machine for assigning to each character a width composed of a total of selected integer units and/or increments comprising selected fractions of such integer unit of predetermined denominator; separate auxiliary escapement mechanism in said reproducer machine for applying to the carriage, when called for by said code selector means, a supplemental fractional-unit escapement in addition to and approximately simultaneously with the rough full-unit or integer escapement, and means operatively connecting said code selector means to the basic escapement mechanism and to said separate auxiliary escapement mechanism for effecting said respective escapements of the carriage.

2. The system as set forth in claim 1 in which the fraction denominator is three, and thus there are comprised in the auxiliary escapement mechanism elements for escaping the carriage in increments of one-third and two-thirds of an integer unit.

3. A system for setting justified variable character width text composition which comprises, in combination, a recorder machine for producing a coded member carrying codes for character selection and spacing, and for functions comprising end-of-line coding including line justification codes, and a reproducer machine for operation by said coded member to produce text composition according to the character selection and justification called for by said coded member; a carriage in said reproducer machine for supporting a medium for the reception of such composition and moving said medium in successive steps past a relatively fixed point of imprinting of the characters, and basic escapement mechanism for moving said carriage in steps comprising one or more predetermined equal integer units of predetermined width, the number of such basic integer units variable roughly in accordance with the prescribed spacing and the character width in a given font; code selector means in said recorded machine for assigning to each character a code calling for a width composed of a total of selected units and/or increments comprising selected fractions of such integer unit of predetermined denominator; and substantially identical code selector means in said reproducer machine; separate auxiliary escapement mechanism appurtenant to said basic integer escapement mechanism in said reproducer machine for applying to the carriage, when called for by said reproducer selector means, a supplemental fractional-unit escapement in addition to and approximately simultaneously with the rough full-unit or integer escapement, and means operatively connecting said reproducer selector means to the basic escapement mechanism and to said separate auxiliary escapement mechanism for effecting said respective escapements of the carriage; and means in said recorder machine for totalizing the fractional unit portions of the successive character width values, and applying a code to the end-of-line coding of said coded member signifying any excess fractional-unit character width count left over at the end of a given line, and means in said reproducer machine for reading such residual fraction code and modifying the justification coding accordingly, so as to insure an accurate justification.

4. The system as set forth in claim 3 in which justification-controlling means in said reproducer machine is constructed and arranged to apply a predetermined normal width to the first word space of the reproduced line and appropriately diminished widths to certain subsequent word spaces in the line to effect accurate justification, and the said justification modifying means is operatively connected with said justification-controlling means to subtract from the width of the first word space such fractional-unit width as may be carried over by the totalizing means.

5. The system as set forth in claim 3 in which said recorder machine is provided with a carriage for supporting a medium for the reception of a trial copy of the composition and means for impressing on said medium the text of said composition; means for escaping said recorder carriage in steps comprising integer units only, i.e. the next lower full unit count for each character, but escaping an extra full unit for a character upon the occasion of said totalizing means adding enough fractional-unit increments to amount to a whole unit.

6. The system as set forth in claim 3 in which said reproducer carriage is divided into two relatively movable sub-carriages: a primary sub-carriage adapted to be controlled by said basic escapement mechanism and a secondary sub-carriage supporting the receiving medium and movable relatively to said primary sub-carriage, said separate auxiliary escapement mechanism operatively connected between the said two sub-carriages to effect such relative movement, and thus accomplish the transmission of both the full unit escapement and the fractional-unit escapement to the secondary sub-carriage.

7. A recorder machine for producing a control tape for the control of a justifying copy reproducer machine, said recorder machine comprising, in combination, a keyboard having character and function keys, a code selector device having movable elements each associated with and adapted to be actuated by one of said character keys, punch means for punching codes in said tape, means in said code selector device allocating different codes to each character and actuating said punch means to punch character identifying codes in the tape in accordance with the element of the code selector which is moved by the actuation of a key, the widths of the characters of a font comprising one or more integer units or combined integer units and increments comprising fractions of such integer unit of predetermined denominator; and means associated with such of the movable selector elements which correspond to characters whose width allocations include a fraction of a unit, for transmitting signals representing said fractions only, totalizing the same as they occur, and punching a code in the tape at the end of the line signalling any fraction left over at that point for modifying the justification procedure for such line in the reproducer machine.

8. The recorder machine as set forth in claim 7 in which the machine includes computer means for actuating the punch means for punching codes in said tape at the end of the line for controlling the justification of the line in the reproducer, by predetermining the width of at least the first word space and diminishing the widths of certain subsequent word spaces, the said justification modifying code resulting from the left-over fraction serving to subtract such fractional unit width from the first word space of the reproduced line.

9. The recorder machine as set forth in claim 7 in which the character code punch means is electrically actuated and controlled by a series of switches selectively actuated by said movable elements; each movable element of the code selector device also connected to a switch adapted to be closed by its movement; electrical leads extending from the switches of each element which corresponds to a character having a width including a fractional unit, to a flip-flop relay system to successively pulse said system to totalize said fraction pulses, the system adapted at the end of a line to pulse the punch means to punch a functional code in said tape appropriate to any excess fraction, so that such fractional-unit may be applied to the justification procedure of the reproducer to modify it.

10. The recorder machine as set forth in claim 7 in which the machine includes computer means for actuating the punch means for punching codes in said tape at the end of the line for controlling the justification of the line in the reproducer, by predetermining the width of at least the first word space and diminishing the widths of certain subsequent word spaces, the said justification modifying code resulting from the leftover fraction serving to subtract such fractional unit width from the first word space of the reproduced line; in which the fractional units of width provided for are one-third of a unit and two-thirds of a unit; in which the punch means is electrically actuated, each movable element of the code selector being connected to a switch adapted to be closed and re-opened by such movement and release thereof; electrical leads extending from the switches of each element which corresponds to a character having a width including a fractional unit to a flip-flop relay system to successively pulse said system to totalize said fraction pulses, the system at the end of a line adapted to pulse the punch means to punch a code in said tape appropriate to the excess fraction, so that such fractional-unit may be applied to the justification procedure of the reproducer to modify it; said flip-flop relay system comprising two alternatively actuated relays, one adapted to be set by the reception of a one-third fraction and the other set by the reception of a two-thirds fraction, and respectively adapted to yield, if in a state of energization at the end of a line, a movement to actuate the punch means to code either a one-third unit or a two-thirds unit signal into the tape.

11. The recorder machine as set forth in claim 9 in which the machine is provided with a carriage for supporting a medium for the reception of a trial copy of the composition and means for impressing on said medium the text of said composition; electrically operated means for escaping said recorder carriage in steps comprising integer units only, and in which the electrical leads extending from the switches of each element of the code selector device which corresponds to a character having a width of whole units go to the appropriate carriage escapement means to actuate the latter to escape the carriage for the full unit count called for, and switching means are provided in said last-named electrical leads actuated by said flip-flop relay system to effect an additional full unit escapement of the recorder carriage whenever the accumulation of fractional-units adds up to a full unit.

12. A proportional spacing text-composing machine comprising, in operatively connected combination, a supporting frame, a carriage installation movable along said frame and adapted to support a medium for reception of such composition and move it successively past a point of impressing of characters thereon, means for selecting a character from a font of characters and applying it to said medium at such point, a code selector device for allocating to each of the various characters widths composed of a total of selected integer units and/or increments comprising fractions of such integer unit of predetermined denominator integer, a coarse escapement device for controlling the escapement of the carriage installation in terms of integer units and a separate finer escapement device for controlling the escapement of the carriage installation in terms of the fractional-units, and means controlled by said code selector device for selectively actuating said escapement devices singly or in combination for appropriate widths as the characters are applied to the medium.

13. The machine as set forth in claim 12 which is in the form of a tape operated reproducer, in which the carriage installation comprises a primary carriage movable along the frame and a secondary carriage carrying the medium and movable with respect to said primary carriage, means operatively connecting said coarse escapement device with said primary carriage for moving the entire carriage installation in integer units of escapement, and means operatively connecting said finer escapement device with said secondary carriage to move the secondary carriage through said fractional-units of escapement.

14. The reproducer machine as set forth in claim 13 in which said primary carriage is provided with a rack member rigid therewith, and said coarse escapement device includes a gear in mesh with said rack, and in which said secondary carriage is provided with a pinion, a fulcrum rack rigid with said frame and a longitudinally shiftable rack carried by said primary carriage, said pinion being in mesh with both of said fulcrum rack and said shiftable rack, and means operatively connecting the shiftable rack with the finer escapement device for moving the shiftable rack to rotate the pinion and apply relatively slight movement to the secondary carriage.

15. The reproducer machine as set forth in claim 14 in which both of said escapement devices are electrically actuated, said code selector device including electric switches and leads connected to both escapement devices, said finer escapement device including at least one solenoid carried by said primary carriage and operatively connected with said shiftable rack.

16. The reproducer machine as set forth in claim 15 in which the units of escapement are divided into thirds, and two solenoids are disposed in parallel position on said primary carriage, each having an axially movable core connected with the respective opposite ends of a swinging yoke member, a stem secured to an end of said shiftable rack and pivoted to the intermediate portion of said yoke member, one of said solenoids energized by the code selector calling for a one-third unit of escapement to move the shiftable rack a proportional slight distance, and both of the solenoids energized by the code selector calling for a two-thirds unit of escapement to further move said shiftable rack.

17. The reproducer machine as set forth in claim 16 in which two mutually-exclusively energizing flip-flop devices are interposed in the circuitry between the code selector device and the finer escapement device, and relays embodied in said flip-flop devices for selectively energizing said solenoids.

18. The machine as set forth in claim 12 in which said carriage installation is provided with a rack member having transversely inclined teeth, said coarse escapement device including a rotatable shaft carrying a gear having inclined teeth meshing with said rack teeth, actuation of the coarse escapement device causing said shaft and gear to rotate and thus move the rack and carriage installation through integer units of escapement, said gear being slidably splined on said shaft, and operative connections between said finer escapement device and said gear to move said gear axially to wedgingly apply further fractional-unit escapement movement to said rack member and carriage installation.

19. A reproducer machine for producing justified compositon under control of a coded tape or like element, and susceptible of operation to allocate widths to characters and word spaces on the basis of full standard integer units of escapement and mixed integer units and increments comprising fractions of such integer units of predetermined denominator of escapement, the coded element carrying both character bodes and function codes as for justification space control, said reproducer machine comprising in combination, a supporting frame, a carriage installation movable along said frame and adapted to support a medium for reception of such composition and move it successively past a point of impressing of characters thereon, means for selecting a character from a font of characters and applying it to the medium at such point, a code selector device for allocating to the various characters as read from the tape predetermined integer and fractional-units of width, a coarse escapement device for controlling the escapement of the carriage installation in terms of standard integer units, and a separate finer escapement device for controlling the escapement of the carriage installation in terms of the fractional-units, and means controlled by said code selector device for selectively actuating said escapement devices singly or in combination for appropriate widths as the characters are applied to the medium, a justification code reader adapted to read codes from said tape calling for a specified normal width of at least the first word spaces of a line and codes signalling a diminution of width for certain subsequent word spaces to conform accuratey to the required justification for the line, means in said justification code reader for reading a coding from the tape signalling a fractional deduction from the first word space in the case of a fractional overage due to the accumulation of fractional-units as well as standard integer units in the procedure, and means for effecting a diminution in the escapement for the first word space equivalent to the detected fractional overage, and applying said diminished escapement to the carriage installation.

20. The reproducer machine as set forth in claim 19 in which the coded signals for the initial word space widths as read from the tape are committed to storage relays and the correcting first word space diminution signals are likewise committed to storage relays, and in which there are provided means actuatable at the appropriate point in the character printing and carriage escapement sequence to transmit impulses from said storage relays into the coarse escapement and/or the finer escapement devices for escaping the carriage installation to the extent of the diminished first word space width.

21. A reproducing machine for producing justified composition under control of a coded tape or like element susceptible of operation to allocate widths to characters and word spaces on the basis of full standard integer units of escapement and mixed integer and fractional-units of escapement, the coded element carrying character and word-space coding for setting a line of type composition and also end-of-the-line coding comprising a reader interlock code together with codes for signalling an excess fractional-unit of escapement for the line, and a justification code together with codes for signalling word-space widths for the first word-space and diminished widths for certain subsequent word-spaces, said reproducer machine comprising, in operatively connected combination, a supporting frame, a carriage installation movable along said frame for supporting a medium for reception of such composition and moving it successively past a point of impressing of characters thereon, means on the frame for selecting a character from a font of characters and applying it to the medium at such point, a coarse escapement device operatively connected with the carriage installation for controlling the escapement thereof in terms of standard integer units, and a separate finer escapement device also operatively connected with said carriage installation for controlling the escapement thereof in terms of the fractions of said standard integer units, a print code reader in said machine for reading and transmitting character and word-space codes to set a line of type, a justification code reader for reading end-of-the-line coding and storing it in said reproducer prior to the reading of the coded line by the print reader, a first code impulse storing device, means operatively connected with said readers effective to cause the justification reader to read said interlock code and any excess fractional-unit codes and to feed impulses representing such latter codes to said initial storage device and then stop reading; means operatively connected with said print reader to cause the print reader upon the completion of reading a line of text to read a portion of the end-of-the-line coding, and as a consequence pulse the justification code reader and stop itself; a secondary code impulse storage means; means operatively connected with said justification code reader for causing the justification code reader then to read the justification coding and accordingly register the normal first word space width code and subsequent word-space diminution codes, and to effect the transfer of the stored fractional-unit carry-over code from said initial storage device to said secondary storage means, and then pulse the print reader to cause it to resume reading; means causing the print reader to then read the justification coding and re-set said initial excess fractional-unit carry-over storage means to zero preparatory to reading the next fractional-unit carry-over code; and means for causing the print reader upon arrival at the first word-space in setting the line to effect the transfer of the stored data with respect to the normal first word-space width and the stored corrective fractional word-space width to apply a modified measure of escapement to the carriage for the said first word-space, 22. The reproducing machine as set forth in claim 21 in which the fractional-units of escapement are one-third unit and two-thirds unit, and the initial storage device comprises electrical flip-flop devices alternatively and mutually exclusively energized respectively by the reception of the one-third unit or two-thirds unit codes, to prepare a circuit to said secondary storage means, means whereby the operation of said justification reader serves to complete said circuit; said secondary storage means comprising relays adapted to prepare circuits to the escapement devices, and holding circuits for said relays; means whereby the operation of the print reader at said first word space serves to complete the circuits to the escapement; and means operative upon completion of the first word space to break said last-named holding circuit and restore said relays to deenergized condition.

23. A proportional spacing text composing machine, such as a typewriter or the like, comprising in combination, a supporting frame, a carriage carrying a medium for the reception of character impressions and supported on said frame for step-by-step escapement movement past a point of impression of a character, means for effecting such impression at said point, carriage return means adapted to be actuated upon reaching an appropriate point in the line, means for effecting escapement of the carriage for distances corresponding to the width of the character impressed, said escapement means comprising a primary escapement means for escapement in integer unit values, and separate supplemental escapement means for escapement of said carriage for additional distances measured in fractions of such units with a predetermined denominator, an escapement value selecting device for allocating integer and/or fractional unit escapement values to said escapement means according to the character impressed, means for adding fractional unit values of successive characters and applying them to said supplemental escapement means for subsequent actuations, and for applying an integer value to said primary escapement means for subsequent actuation whenever the total of fractional values carried amounts to a whole unit or more, and means for returning the supplemental unit escapement means to zero upon carriage return operation, tabular means operatively incorporated in the machine, and means for clearing any residual fractional values in the secondary escapement means to zero upon actuation of said tabular means as well as upon actuation of said carriage return.

24. A machine for reproducing text composition under the control of a coded tape or the like which tape carries codes for both character impression and justification of lines, means for reading and translating said codes for character selection, means for effecting escapement of the carriage for distances corresponding to the width of the character impressed, said escapement effecting means comprising a primary escapement means for escapement in integer unit values, and a separate supplement escapement means for escapement of said carriage for additional distances measured in fractions of such units, an escapement value selecting device for allocating integer and/or fractional unit escapement values to said escapement means according to the character impressed, means for adding fractional unit values of successive characters and applying them to said supplemental fractional escapement means for subsequent actuations, and applying an integer value to said primary escapement means for subsequent actuation whenever the total of fractional values carried amounts to a whole unit or more, means for dropping out stored fractional unit values of escapement upon actuation of tabular or carriage return means, means for reading the codes for justification on the basis of both full unit and fractional unit values, and means for escaping the carriage for word spacing accordingly.

25. In a text composing machine, suitable for direct imprinting of text composition or the preparation of a tape with coded representations of such composition, and for manual or automatic operation: width and spacing control devices comprising, in combination, a supporting frame, means on said frame for supporting a character-image receiving medium, means for selecting a character to be imprinted and applying its image to said medium, means for effecting relative escapement movement in one direction and return movement in the opposite direction between said image applying means and said medium supporting means, a selector device for allocating to the various characters escapement values of integer units and/or fractions of such integer units of predetermined denominator, according to the predetermined widths of said characters, means for deriving from said selector device both integer and fractional unit values for each character as thus allocated, separate means for applying said integer unit values and said fractional-unit values to said escapement effecting means for effecting appropriate escapement movement for a selected character, said applying means including means for storing said fractional unit values for adding them to accumulated previously derived fractional unit values, and for applying an integer value to the escapement effecting means whenever the total of said fractional unit values amounts to an integer, and means operable upon such relative return movement between the said medium supporting means and said image applying means to restore to zero any remaining accumulated fractional values at that time.

References Cited

UNITED STATES PATENTS

| | | | |
|---|---|---|---|
| 996,300 | 6/1911 | Timmis | 197—20 |
| 2,439,470 | 4/1948 | Jackson | 197—84.3 X |
| 2,632,548 | 3/1953 | Ackerman. | |
| 2,700,447 | 1/1955 | Blodgett | 197—20 |
| 2,724,183 | 11/1955 | Edison | 95—4.5 X |
| 3,082,670 | 3/1963 | Sausele. | |
| 3,095,076 | 6/1963 | Sausele | 197—84 |

WILLIAM B. PENN, *Primary Examiner.*

ROBERT E. PULFREY, *Examiner.*

E. T. WRIGHT, *Assistant Examiner.*